United States Patent
Rapowitz et al.

(10) Patent No.: US 12,217,303 B2
(45) Date of Patent: Feb. 4, 2025

(54) SYSTEMS AND METHODS FOR CURRENCY TRANSFER USING AUGMENTED REALITY ENVIRONMENTS

(71) Applicant: Capital One Services, LLC, McLean, VA (US)

(72) Inventors: Samuel Rapowitz, Roswell, GA (US); Kevin Osborn, Newton Highlands, MA (US); Mia Rodriguez, Broomfield, CO (US); Kathryn Tikoian, South Orange, NJ (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 183 days.

(21) Appl. No.: 18/052,734

(22) Filed: Nov. 4, 2022

(65) Prior Publication Data
US 2024/0152993 A1  May 9, 2024

(51) Int. Cl.
| | |
|---|---|
| G06Q 30/00 | (2023.01) |
| G06Q 20/22 | (2012.01) |
| G06Q 20/36 | (2012.01) |
| G06Q 20/40 | (2012.01) |
| G06Q 30/0601 | (2023.01) |
| G06T 19/00 | (2011.01) |

(52) U.S. Cl.
CPC ....... *G06Q 30/0643* (2013.01); *G06Q 20/223* (2013.01); *G06Q 20/36* (2013.01); *G06Q 20/40* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 10,037,082 B2 * | 7/2018 | Schulz | G06Q 20/321 |
| 10,078,863 B2 | 9/2018 | Loganathan | |
| 10,083,482 B2 | 9/2018 | Mehew et al. | |
| 10,515,349 B1 | 12/2019 | Bryant | |

(Continued)

FOREIGN PATENT DOCUMENTS

CN        106845980 B     12/2021

*Primary Examiner* — Mila Airapetian
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a system providing for currency transfer using augmented reality environments. The system may receive, at a user device associated with a user, a first input indicating a first selection of a first augmented reality item. The system may receive a second input indicating a first movement of the first augmented reality item. The system may determine whether the first augmented reality item is in proximity to a purchasable item. In response to determining that the first augmented reality item is in proximity to the purchasable item, the system may initiate a transfer by receiving image data containing a computer readable code associated with the purchasable item, processing the image data, retrieving store account information and transfer information regarding the purchasable item, retrieving user account information, and transmitting, to an account processor, the user account information, the store account information, and the transfer information.

16 Claims, 9 Drawing Sheets

(56) References Cited

U.S. PATENT DOCUMENTS

| | | | |
|---|---|---|---|
| 10,581,611 | B1 | 3/2020 | Osborn et al. |
| 10,685,379 | B2 | 6/2020 | Purves et al. |
| 11,037,116 | B2 | 6/2021 | Sinha et al. |
| 11,068,968 | B2 | 7/2021 | Kuoh et al. |
| 11,074,644 | B2 | 7/2021 | Loganathan |
| 2017/0262855 | A1 | 9/2017 | Venugopalan et al. |
| 2018/0181946 | A1 | 6/2018 | Miryala et al. |
| 2019/0012735 | A1 | 1/2019 | Mehew et al. |
| 2019/0180270 | A1* | 6/2019 | Ericson ............... G06Q 20/4014 |
| 2019/0377417 | A1 | 12/2019 | Friedman |
| 2020/0082389 | A1 | 3/2020 | Regev |
| 2021/0233128 | A1 | 7/2021 | Gabriele et al. |
| 2021/0312412 | A1 | 10/2021 | Sinha et al. |
| 2021/0319443 | A1 | 10/2021 | Sukhija et al. |
| 2021/0319452 | A1 | 10/2021 | Ramanathan et al. |
| 2022/0101292 | A1* | 3/2022 | Mahanti ............... G06Q 20/209 |
| 2023/0316247 | A1* | 10/2023 | Gordon ................ G06F 3/0482 |
| | | | 705/44 |
| 2024/0152902 | A1 | 5/2024 | Rapowitz |

* cited by examiner

SYSTEMS AND METHODS FOR CURRENCY TRANSFER USING AUGMENTED REALITY ENVIRONMENTS

CROSS-REFERENCE TO RELATED APPLICATION

This application relates to U.S. patent application Ser. No. 17/980,918, filed Nov. 4, 2022, listing Samuel Rapowitz, Kevin Osborn, Mia Rodriguez, and Kathryn Tikoian as inventors, and entitled "Systems and Methods for Currency Transfer Using Virtual or Augmented Reality Environments," the entire contents of which are hereby incorporated by reference in its entirety as if fully set forth herein.

FIELD

The disclosed technology relates to systems and methods providing for currency transfer using augmented reality environments. Specifically, this disclosed technology relates to using an augmented reality environment to execute a currency transfer between two users or a user and a merchant.

BACKGROUND

Traditional systems and methods for currency transfer typically involve users sending money from one person to another using a cell phone. While this is functional, these technologies are very static in nature. They do not allow the user to see or feel the financial transfer as it used to be when cash traded hands. Furthermore, these technologies often require the clunky use of a cell phone, where the user has to enter their own complicated banking data and that of the person or entity they are attempting to transfer money to. Finally, in many situations, authentication on such devices can be troublesome and off-putting.

Accordingly, there is a need for improved systems and methods providing for currency transfer using augmented reality environments. Embodiments of the present disclosure are directed to this and other considerations.

SUMMARY

Disclosed embodiments may include a device for making currency transfers using augmented reality environments. The device may include one or more displays, one or more processors, and memory in communication with the one or more processors and storing instructions that, when executed by the one or more processors, are configured to cause the system to provide for a currency transfer using augmented reality environments. The device may receive a first input indicating a first selection of a first augmented reality item associated with a first user. The device may also receive transfer information comprising an amount to transfer to a second user. Additionally, the device may receive, from a second user device, a second augmented reality item associated with the second user. Furthermore, the device may display the first augmented reality item and the second augmented reality item via the one or more displays. The device may receive a second input associated with a first movement of the first augmented reality item. The device may determine whether the first augmented reality item is in proximity to the second augmented reality item. In response to determining the first augmented reality item is in proximity to the second augmented reality item, the device initiate a peer-to-peer transfer by retrieving first user account information associated with the first user, receiving, from the second user device, second user account information, and transmitting, to an account processor indicated by the first user account information, the first user account information, the second user account information, and the transfer information.

Disclosed embodiments may include a device for making currency transfers using augmented reality environments. The device may include one or more displays, one or more processors, and memory in communication with the one or more processors and storing instructions that, when executed by the one or more processors, are configured to cause the system to provide for a currency transfer using augmented reality environments. The device may receive a first input indicating a first selection of a first augmented reality item of a first user. The device may also receive transfer information comprising an amount to request from a second user. Additionally, the device may receive, from a second user device, a second augmented reality item of the second user. Furthermore, the device may display the first augmented reality item and the second augmented reality item via the one or more displays. The device may receive, from the second user device, a second input indicating a first movement of the second augmented reality item. The device may determine whether the second augmented reality item is in proximity to the first augmented reality item. In response to determining that the second augmented reality item is in proximity to the first augmented reality item, the device may initiate a peer-to-peer transfer by retrieving first user account information associated with the first user, receiving, from the second user device, second user account information, and transmitting, to an account processor indicated by the second user account information, the first user account information, the second user account information, and the transfer information.

Disclosed embodiments may include a system for currency transfer using augmented reality environments. The system may include one or more processors, and memory in communication with the one or more processors and storing instructions that, when executed by the one or more processors, are configured to cause the system to provide for currency transfer using augmented reality environments. The system may receive, at a user device associated with a user, a first input indicating a first selection of a first augmented reality item. The system may also receive, at the user device, a second input indicating a first movement of the first augmented reality item. Furthermore, the system may determine whether the first augmented reality item is in proximity to a purchasable item In response to determining that the first augmented reality item is in proximity to the purchasable item, the system may initiate a transfer by receiving image data, at the user device, containing a computer readable code associated with the purchasable item, processing the image data, retrieving, from the image data, store account information and transfer information regarding the purchasable item, retrieving user account information, and transmitting, to an account processor, the user account information, the store account information, and the transfer information.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1A:
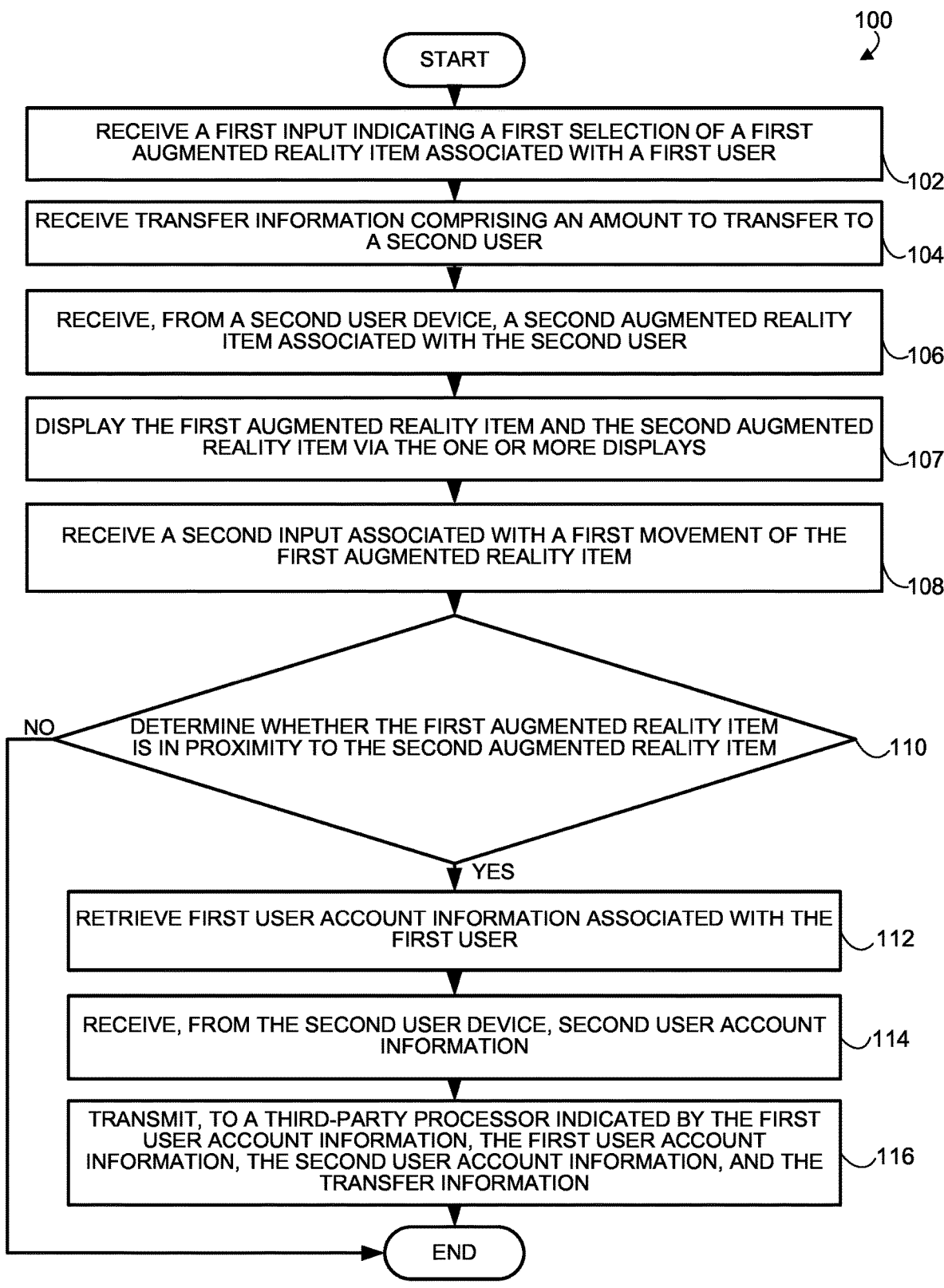
FIG. 1A is a flow diagram illustrating an exemplary method for currency transfer using augmented reality environments in accordance with certain embodiments of the disclosed technology.

Examples of the present disclosure related to systems and methods for currency transfer using augmented reality environments. More particularly, the disclosed technology relates to an augmented reality peer-to-peer currency transfer (e.g., a user giving or receiving money to/from another user via one account to another) and a purchase currency transfer system (e.g., a user paying for an item at a store). The systems and methods described herein utilize, in some instances, graphical user interfaces, which are necessarily rooted in computers and technology. Graphical user interfaces are a computer technology that allows for user interaction with computers through touch, pointing devices, or other means. The present disclosure details an augmented reality environment, presented on a user device that may show augmented reality items using a display in conjunction with physical items. This, in some examples, may involve using input data from a camera or other sensors to dynamically change the graphical user interface so that the augmented reality items presented to the user interact with and change with the user's physical environment, specifically if the physical environment contains another augmented reality user. Using a graphical user interface in this way may allow the system to conduct peer-to-peer currency exchanges between two people each with an augmented reality device. By providing a graphical means to visualize currency exchanges between users, for example, the user interface of the disclosed embodiments may provide a unique improvement over existing technologies. This improvement may be recognized as particularly stark in light of the limitations of existing systems, which do not allow users to visualize peer-to-peer currency transfers. The present disclosure improves peer-to-peer transfers by tracking a user's movements and receiving signals of a second user's movements. Using the combined information, the system can present augmented reality items that each user can see on their user device to conduct a peer-to-peer transfer. Furthermore, examples of the present disclosure may also improve the speed with which computers can authenticate peer-to-peer and payment transactions by making the authentication process more straightforward with augmented reality devices. Overall, the systems and methods disclosed have significant practical applications in the augmented reality and payment processing fields because of the above-mentioned example improvements of using an augmented reality system to visualize and conduct a currency transfer, which is important to improving the above-mentioned issues of present technologies.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1A is a flow diagram illustrating an exemplary method 100 for currency transfer using augmented reality environments, in accordance with certain embodiments of the disclosed technology. The steps of method 100 may be performed by one or more components of the system 400 (e.g., currency transfer system 320 or web server 410 of augmented reality system 408 or user device 402), as described in more detail with respect to FIGS. 3 and 4.

In block 102, the first user device 402 may receive a first input indicating a first selection of a first augmented reality item associated with a first user. This may occur using an augmented reality device such as a headset or cell phone with augmented reality (AR) capabilities. The AR device of currency transfer system 320 may include one or more displays and one or more cameras. The displays may be at least partially see-through and allow the device to display images on top of the user's physical environment. The AR device may also include an array of sensors, including, for example cameras to watch the user's environment, cameras to watch the user's actions or impressions (e.g., facial expressions or blinking), microphones to listen to user or the user's environment, accelerometers, gyrometers, fingerprint scanners, retinal scanners, and other similar sensors known in the art. The AR device may contain tactile control devices such as a joystick. The AR device may also include the ability to communicate using near field communication (NFC), Bluetooth, WiFi, cellular data or other technologies known in the art. The AR device may be linked with the user's cell phone. The AR device may be running software that allows it to uniquely interface with augmented reality system 408. AR system 408 and currency transfer system 320 may be able to interact directly with the sensors on AR device. Currency transfer system 320 and/or augmented reality system 408 may operate in whole or in part on the hardware of first user device/AR device 402.

This step may involve a user selecting a first AR item specific for use with currency transfer system 320. In the AR environment, the user may have an inventory of items that they can select from. The inventory of the user may contain a plethora of AR items, used for a plethora of difference purposes in the AR environment. For example, the inventory may be visualized as a backpack or chest. Inside the backpack, the user may be able to select a shovel for the user to dig in the AR environment. The user may select the first AR items using a number of different means, such as physically manipulating a mechanical input device (e.g., scrolling on a mouse), making a gesture (e.g., blinking or moving arms), or touching a button on the AR device.

The first AR item for currency transfer system 320 may be in the form of a wallet, bank, bank logo, transaction platform logo, currency logo, payment instrument, transaction card (e.g., a debit or credit card), piggy bank, safe, or currency symbol (e.g., bill or coin). One or more AR items may represent the currency transfer system 320. The user may be able to use user device 402 to select the AR item used to select currency transfer system 320. When the user inputs an action to user device 402 to select the AR item associated with currency transfer system 320, the currency transfer system 320 receives an input indicating the selection of the AR item associated with currency transfer system 320. The AR system 408 may show the first AR item as selected by the first user in the display of the first user. The first AR item may be shown in the virtual hand of the first user. Other users may be able to see that the first user has the first AR item in his hand.

The first AR item may be associated with a user account of the first user. The user account may include payment information, such as a source of funds (e.g., bank account number), identification information (e.g., bank routing number, username), the payment platform (e.g., PayPal™, Venmo™), and/or contact information. Currency transfer system 320 or AR system 408 may be able to save this information (e.g., to database 360 or database 416, which may be located on user device 402) and may contain presets so that the user can have this information automatically populate when the first AR item is selected. The user device 402 may display a previously saved nickname for each account (e.g., "John's Bitcoin wallet") and present that to the user rather than display the user's account information. This would eliminate the user's sensitive account information from having to be displayed on user device 402. Alternatively or additionally, the first user may use currency transfer system 320 to setup the first augmented reality item so that the same account is used each time and no account choice or further information is required after the primary setup.

Once the system recognizes that the user has indicated using user device 402 to select the augmented reality item associated with currency transfer system 320, the system may begin searching for other AR users in the first user's vicinity. This may involve user device 402 looking for a second user device 404. This may involve using Bluetooth™, WiFi™, cellular data, or other similar technologies to search for nearby devices. The search may be limited to devices associated with contacts or friends of the user. The search may be limited to a specific distance from the user. The search may be limited to a specific area, like a store or meeting place. The search may involve using the sensors, such as a camera, to identify other users located near the second user. The search may provide an internal list to currency transfer system 320 of possible second user candidates.

In block 104, the first user device 402 may receive transfer information comprising an amount to transfer to a second user. Upon the receipt of the signal that the user has instructed the first user device 402 to select the first augmented reality item associated with the currency transfer system 320 in block 102, currency transfer system 320 may prompt the user to enter transfer information. The transfer information may include an assortment of necessary information regarding a fund transfer. The prompt may require the user to specify, the amount to transfer (e.g., amount in dollars, amount in a cryptocurrency such as Bitcoin), the payment platform (e.g., PayPal™, Venmo™), or the fund source using the nickname provided or by entering new information. The amount may be a currency (e.g., a fiat currency, such as the U.S. dollar), digital currency, or a cryptocurrency, such as Bitcoin or Ethereum. The amount may or may not be a video game currency. The prompt may include just the amount to transfer and the user's account choice. After the user selects the necessary transfer information, the system stores the transfer information.

In block 106, the first user device 402 may receive, from a second user device, a second augmented reality item associated with the second user. The second user device 404 may be largely similar to first user device 402 and may contain the same sensors. The second user may have access to a second inventory full of their augmented reality items. The operation of the second user using a second user device 404 to select the second augmented reality item may be largely similar to the first user selecting the first augmented reality item. The second user device 404 may be running special software to allow it to interface with first user device 402 and/or currency transfer system 320.

Once the second user selects the second augmented reality item, the user device 404 may begin searching for other AR users in the first user's vicinity. This may involve user device 404 looking for first user device 402. This may involve using Bluetooth™, WiFi™, cellular data (e.g., 3G, LTE, or 5G), or other similar technologies to search for nearby devices. The search may be limited to devices associated with contacts or friends of the user. The search may be limited to a specific distance from the user. The search may be limited to a specific area, like a store or meeting place. The search may involve using the sensors, such as a camera, to identify other users located near the second user. Once the first user device 402 identifies the second user device 404, or the second user device 404 identifies the first user device 402, a connection between the two devices may be formed. This connection may be used to share information (e.g., transfer information, telemetry information, identification information) and display common images, animations, and videos. When one user device identifies the other some form of verification may be transmitted to the respective user. Alternatively, the user devices 402, 404 may be able to perform a digital exchange of information (e.g., digital handshake) that may serve as verification if necessary. Verification may only be required if the first user is not known associates (e.g., friends, contacts, acquaintances) with the second user or vice versa.

The second user device 404 may transmit the selection of the second augmented reality item to the first user device 402 so that the first user device 402 may display the second augmented reality item in the user's environment. The second augmented reality item may be in the form of a wallet, bank, bank logo, transaction platform logo, currency logo, payment instrument, transaction card (e.g., a debit or credit card), piggy bank, safe, or currency symbol (e.g., bill or coin). One or more augmented reality items may represent the currency transfer system 320. The user may be able to use their user device 402 to select the augmented reality item associated with currency transfer system 320. The second augmented reality item may be represented by the same image or figure as the first augmented reality item. When the user uses their user device 402 to select the augmented reality item associated with currency transfer system 320, the second user device 404 may send a signal to the first user device 402 so that the first user device 402 may display the second augmented reality item. Similarly, the first user device may send a signal to the second user device 404 so that the second user device 404 may display the first augmented reality item. The augmented reality system 408 may show the second augmented reality item as selected by the second user in the display of the second user. The second augmented reality item may be shown in the virtual hand of the second user. Alternatively, if currency transfer system 320 and/or augmented reality system 408 are not directly operated on the hardware of first user device 402, the second user device 404 may send the signal of the second augmented reality device directly to currency transfer system 320. Currency transfer system 320 may be able to relay the signals of the second user device 404 to first user device 402. Other users may be able to see that the second user has the second augmented reality item in his hand.

The second augmented reality item may be associated with a user account of the second user. The user account may include payment information, such as a source of funds (e.g., bank account number), identification information (e.g., bank routing number, username), the payment platform (e.g., PayPal™, Venmo™), and/or contact information. Currency transfer system 320 or augmented reality system 408 may be able to save this information (e.g., to database 360 or database 416, which may be located on second user device 404) and may contain presets so that the user can have this information automatically populate when the first augmented reality item is selected. The user device 404 may display a previously saved nickname for each account (e.g., "Scott's Bitcoin wallet") and present that to the user rather than display the user's account information. This would eliminate the user's sensitive account information from having to be displayed on user device 402. Alternatively, the second user may setup the second augmented reality item so that the same account is used each time and no account choice or further information is required after the primary setup. The action of both users selecting the first and second augmented reality items is analogous in the physical world to both users taking out their wallets, with one user preparing to hand over a dollar and the other user preparing to receive it.

In block 107, the first user device 402 and second user 404 may display the first augmented reality item and the second augmented reality item via the one or more displays. After the user devices 402, 404 receive the signals containing the first and second augmented reality items (from either the opposing user device, or from a server running currency transfer system 320 and/or augmented reality system 408), the user devices 402, 404 may display the first and second augmented reality items. In the case of the first user device 402, it may receive the signal from the second user device 404 containing the image or animation of the second augmented reality item. The first user device 402 can use the signal from the second user device 404 to render the second augmented reality item in the first user's field of view as appropriate. For example, if the second user has selected the second augmented reality item and, in his augmented environment, the second user sees the second augmented reality item in his hand through the augmented reality display, the second user device 404 sends a signal to the first user device 402, thereby allowing the first user device 402 to render the second augmented reality item for the first user. Therefore, the first user is able to see, through his augmented reality display, the second augmented reality item in the hand of the second user. Likewise, the first augmented reality item can be rendered and displayed for the second user in a similar fashion using a signal transmitted from the first user device 402.

In block 108, the first user device 402 may receive a second input indicating a first movement of the first augmented reality item. The one or more sensors, as described in the paragraphs above, may be used to detect the third input, which the system may recognize as constituting a movement. The requirements to be recognized as a movement may have to meet certain thresholds as defined by the system (e.g., speed thresholds, gyroscopic thresholds). The sensor data may be filtered before being used to define movements. With both users having selected the first and second augmented reality items using their respective user devices 402, 404, which are both associated with the currency transfer system, the currency transfer system 320 is aware that a potential transfer may take place. Both users may be able to see that the other user is holding an augmented item associated with currency transfer system 320. Each user may be able to move around the augmented item within the augmented environment via inputs monitored by their user devices 402, 404. The augmented item may remain in the user's hand. The first user may make a second input with user device 402 that moves the first augmented item. This input could be made in any of the ways described using the augmented reality device above. The user device 402 may send an indication to the currency transfer system 320 that the first user has moved the first augmented reality item in a certain way. The second input by the first user is equivalent to accepting the transfer and is an acknowledgement of an agreement to transfer (similar to e.g., when a consumer at a grocery store signs a receipt, when a person clicks a buy button when purchasing an item online).

The second input may be made by the first user to "accept" the transfer and may have a variety of different forms. The acceptance input may be a plethora of different inputs received by user devices 402, 404 involving one user or both users. Since, in this example, the first user is the donor and is deciding the amount, the first user may be solely required to complete the acceptance action. Alternatively, the first user and second user may both be required to complete the acceptance action. The first user may input to user device 402 to move the first augmented reality item to touch or be close to the second augmented reality item of the second user. Moving the first augmented reality item close to the second augmented reality item may allow the first user to "use" the first augmented reality item and complete the transfer to the second user. The first user may have to, by making inputs to the user device 402, hold the first augmented reality item close to the second augmented reality item for a certain predetermined number of seconds, as discussed in block 110.

Furthermore, the acceptance input could require both the first user and the second user to both "use" the augmented reality items at the same time while a certain distance from each other. "Using" the items may require the users to press a certain button on their user device 402 or complete a certain action (e.g., jumping). The buttons may have to be pressed or the action may have to be completed by both users within a certain amount of time of each other. The input required for acceptance could require simply that the two users are within a certain distance from each other, and the first user has selected a first augmented reality item and the second user has selected a second augmented reality item. The acceptance input could further require that the two users be looking at one another or be each looking at the augmented item to accept the transfer. The acceptance input could be a virtual handshake or other greeting (e.g., wave, thumbs up, smile) while holding the virtual objects.

Alternatively, the acceptance input may not be visible in the virtual reality environment. The acceptance input may be an action made by the first user in the first user's physical environment and detected by buttons or sensors of user device 402. Acceptance input of this nature may be a blink in a certain fashion or a finger motion. Acceptance input may also be made in a similar manner for the second user using the second user device 404.

In block 110, the first user device 402 may determine whether the first augmented reality item is in proximity to the second augmented reality item. The currency transfer system 320 may constantly monitor the location and movement of the first augmented reality item and second augmented reality item. The currency transfer system 320 may constantly monitor a comparison of the location and movement of the first augmented reality item compared to the second augmented reality item. This may involve receiving inputs from both first user device 402 and second user device 404. The input from second user device 404 may be sent to user device 402 to make this determination if currency transfer system 320 is operating on the hardware of first user device 402. Alternatively, the device may also monitor the location and movement of the first augmented reality item and second augmented reality item and record when a certain relationship between the first and second augmented reality items occurs.

The first user device 402 may use a number of methods to determine whether the first augmented reality item is in proximity to the second augmented reality item. This may include measuring a virtual distance from the first virtual reality to the second virtual reality item and determining whether the virtual distance is less than a predetermined threshold for a predetermined amount of time. For example, the virtual distance may indicate a certain proximity of closeness from the first virtual reality item to the second virtual reality item (e.g., if the first virtual reality item is within 6 virtual inches of the second virtual reality item). The virtual distance required may be zero (e.g., where the first virtual item must touch the second virtual item). The predetermined threshold may be preset and general (e.g., 6 virtual inches) or situationally specific (e.g., 6 virtual inches when standing on flat non-moving virtual ground, but 18 virtual inches when standing on moving virtual ground). The predetermined threshold may be changed based on user preferences, or adaptive based on user habits.

Furthermore, the first augmented reality item may be required to be within the predetermined distance of the second augmented reality item for a predetermined amount of time (e.g., 5 seconds). The predetermined time threshold prevents accidental transfers where the first augmented reality item was within the predetermined distance to the second augmented reality item, but the first user did not intend to make the transfer. If a predetermined time threshold is required to complete the transfer, the augmented reality environment may display an indicator showing both the first user and the second user how much time is remaining for the transfer to occur, and, therefore, how much time the users have to continue to hold the distance of the first or second virtual reality item. The indicator may have a variety of features and may count up or count down. The indicator may be a graphic showing a percentage or may show the number of seconds remaining. The predetermined time threshold may be preset and general (e.g., always 5 seconds) or situationally specific. The predetermined time threshold may be changed based on user preferences.

In response to the currency transfer system 320 determining that the first augmented reality item is in proximity to the second augmented reality item, and, therefore, the acceptance of transfer, the currency transfer system 320 may generate a graphical indication of the payment transfer. The graphical indication of payment transfer may be a simple phrase presented in the augmented reality environment (e.g., "Payment transfer accepted") and may be visible to both the first user and the second user. Alternatively, the graphical indication of payment transfer may be a symbol connected with a funds transfer (e.g., $) or may be a two-dimensional or three-dimensional animation (e.g., bills or coins flying from one user's hand or the virtual item to the other user's hand or virtual item). The funds in the animation may correspond to the types of funds used to transfer (e.g., if the transfer involves a U.S. dollar bank transfer, then the animation may show a fictionalized graphical image of dollars; if the transfer involves Bitcoin, then the animation may show a fictionalized graphical image of Bitcoin). The animation may correspond to the amount of the transaction (e.g., if the first user accepts the transfer of $20, then the animation of the dollar flying from the first user to the second user would include a $20 bill; if the transfer was for $35, the animation may include a $20 bill, a $10 bill, and a $5 bill).

In block 112, the first user device 402 may retrieve first user account information associated with the first user and the transfer information. The first user may have entered their account information when selecting the first augmented reality item in block 102 and the information may have been stored to database 360 or database 416. Alternatively, the first user may have pre-entered account information for use with the first augmented reality item and the information was stored in database 360 or database 416. The first user account information may contain identification information (e.g., bank account number, routing number, username) and the payment platform (e.g., PayPal™, Venmo™). Transfer information, such as the amount to transfer (e.g., amount in dollars, amount in a cryptocurrency such as Bitcoin), and the payment platform (e.g., PayPal™, Venmo™) may be retrieved by the currency transfer system 320 in this step.

In block 114, the first user device 402 may receive, from the second user device, second user account information. Once the transfer has been accepted by the first user, currency transfer system 320 may receive the second user's account information from second user device 404. This may be transmitted by secured methods to first user device 402 over the connection formed in step 106. Alternatively, the second user device 404 may send a link to first user device 402, the link may contain instructions on obtaining the second user's account information from a secure 3rd party server. In another example, the second user device may send the second user account information to directly to the currency transfer system 320 if currency transfer system 320 is not operated on the hardware of first user device 402.

In block 116, the first user device 402 may transmit, to a payment processor 430 indicated by the first user account information, the first user account information, the second user account information, and the transfer information. This may be completed by first user device 402 if the currency transfer system 320 is operated on the first user device 402 hardware. The payment processor 430 may be a $3^{rd}$ party server connected through the internet or may be part of, or directly attached to, currency transfer system 320. The payment processor 430 may be a third-party processor or an account processor. The transmission to the payment processor 430 may involve a publish subscribed messaging system (PSMS), such as MQTT, where the virtual reality system 408 can communicate directly with the payment processor 430 using a permissioned messaging service. Alternatively, the currency transfer system 320 may transmit the information to the payment processor 430 using a queue-based messaging system. The currency transfer system 320 may determine which payment processor 430 is appropriate for the transfer and then send the information to that payment processor 430.

Before transmitting the account and transfer information to the payment processor 430, the currency transfer system 320 may determine that authentication is required from either the first user, the second user, or both. The first user device 402 may request the user authenticate the transfer. This may require the first user to provide authentication information to the first user device. Authentication information may be a password, a verification, a retinal or iris scan, and fingerprint scan, an authentication gesture, placing a financial transaction card close to user device 402 to allow user device 402 to read the financial transaction card using NFC (e.g., using a gesture from the transaction card to the user device, or tapping the card to the user device), using a camera on the user device 402 to scan a financial transaction card and recognize the numbers using optical character recognition (OCR), among other methods. The authentication information may be transmitted by a contactless payment card in accordance with the methods discussed in reference to FIGS. 5 through 8, wherein the user device 402 may be referred to as the client device. An authentication gesture may be a specific or unique action, designated by the user that can be perceived or sensed by the user's device and indicates that the user is authenticated. Furthermore, if the user has an additional user device (e.g., if a user had an AR headset and a smartphone), the currency transfer system 320 may be able to send a signal to the additional user device using a network asking the user to authenticate (e.g., the currency transfer system 320 knows the user's phone number and sends the user a text message asking the user to authenticate the transaction). The currency transfer system 320 may be able to interface with a mobile application on the user's additional user device (e.g., smartphone). The mobile application may allow the user to provide a fingerprint, password, or passcode for authentication, among other authentication modalities.

The first user device 402, having received the information, may relay the authentication information to currency transfer system 320. Currency transfer system 320 may have the ability to determine if the first user is authenticated and can make the peer-to-peer transfer. Currency transfer system 320 may store, with the first user account, verification information that can compared to the received authentication information to determine if the authentication information is legitimate. Similar methods may be used to authenticate the second user if the currency transfer system 320 determines that authentication is required for the second user.

Alternatively, currency transfer system 320 may receive an indication after transmitting the first user account information, the second user account information, and the transfer information from the payment processor 430 that authentication is required from the first user, the second user, or both. Currency transfer system 320 may receive the authentication information from the user's respective devices 402, 404 and relay the authentication information to the payment processor 430. The payment processor 430 may then determine if the first user is authenticated. Similar methods may be used to authenticate the second user if the currency transfer system 320 determines that authentication is required for the second user.

Before transmitting the account and transfer information to the payment processor 430, the currency transfer system 320 may determine if the account transfer information given by the first user and the second user is compatible. For example, if the first user gives a bank account information for a bank account using U.S. dollars and the second user provides a cryptocurrency address for an account using Bitcoin, the system may decline the transaction and ask one or both users for another payment method. Alternatively, the system may send both users a warning. In another example, the system may exchange one currency for the other and complete the transfer. The system may charge one or more users for an exchange fee. One or both users may be able to choose one or multiple of the above options when setting up the associated user account. In some circumstances, the payment processor 430 may be indicated by the first user account information or the account information of the donor. Alternatively, the payment processor 430 may be indicated by the transfer information or the second user account information.

After receiving the indication that the payment was processed successfully, from the payment processor 430, the first user device 402 may notify the first user that the payment was processed successfully. Additionally, the first user device 402 send a signal to the second user device 404 that the payment was successful. The second user device 404 may alter the second user that the payment was successfully processed. The first user device 402 may then terminate the connection created between the first user device 402 and the second user device 404 in block 106.

The first user device 402 may be able to interact with a financial transaction card. The financial transaction card may be used to authenticate the user as described in paragraph 41. This may operate using near field communication signaling. The messaging signals between the transaction card and the first user device 402 may conform to a Europay-Mastercard-Visa (EMV) contactless standard. This may comprise one or more cryptograms.

Figure 1B:
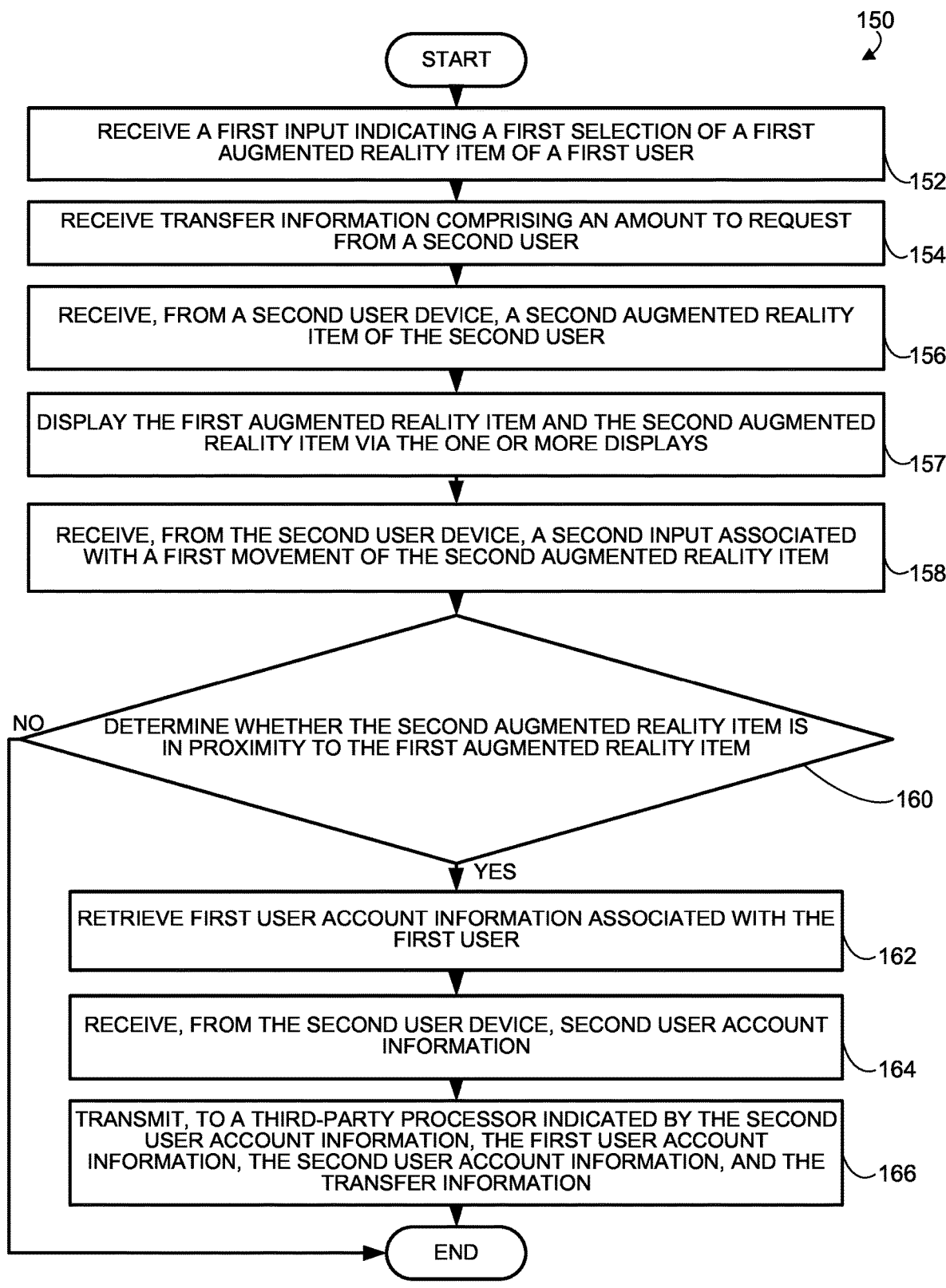
FIG. 1B is a flow diagram illustrating an exemplary method for currency transfer using augmented reality environments in accordance with certain embodiments of the disclosed technology.

FIG. 1B is a flow diagram illustrating an exemplary method 150 for currency transfer using augmented reality environments, in accordance with certain embodiments of the disclosed technology. The steps of method 150 may be performed by one or more components of the system 400 (e.g., currency transfer system 320 or web server 410 of augmented reality system 408 or user device 402), as described in more detail with respect to FIGS. 3 and 4. In this example, a first user (the recipient) requests a selected amount from a second user (the donor).

Method 150 of FIG. 1B is similar to method 100 of FIG. 1A. The descriptions of blocks 152, 156, 157, 162, and 164 in method 150 are similar to the respective descriptions of blocks 102, 106, 107, 162, and 164 of method 150 and are not repeated herein for brevity. However, blocks 154, 158, 160, and 166 are different from blocks 104, 108, and 116 and are described below.

In block 154, the first user device 402 may receive transfer information comprising an amount to request from a second user. Unlike method 100, where the first user is the donor and the donor chooses the amount to give the recipient, method 150 involves the first user being the recipient and the recipient requests an amount from the donor. In block 154, unlike block 104, the recipient completes and sends the transfer information to currency transfer system 320. Once the first user enters the transaction information and requested amount, the second user may be able to see the requested amount or transaction information by looking at the first user or looking at the first augmented reality item. The display of the requested amount or transaction information may be a static or animated text or graphic. Other than the differences stated, the information regarding block 104 also applies to block 154 and is not repeated herein for brevity.

In block 158, the first user device 402 may receive, from the second user device, a second input indicating a first movement of the second augmented reality item. In block 158, unlike block 108, the currency transfer system 320 receives information regarding the movement of the second augmented reality item, rather than receiving the first augmented reality item. Since in method 150, the recipient (first user) is the user choosing the amount, the donor (second user) must accept the transfer. The augmented reality item associated with the donor is monitored as the donor is the user accepting the transfer. The second input may be sent by the second user device 404 to the first user device 402 over the connection created in step 156. Other than the difference that the second augmented reality item (the augmented reality item associated with donor) is received by the currency transfer system 320, the information regarding block 108 also applies to block 158 and is not repeated herein for brevity.

In block 160, the first user device 402 may determine whether the second virtual reality item is in proximity to the first virtual reality item. Like block 110, the donor has to accept the transfer. Therefore, currency transfer system 320 may analyze the movement or use of the second virtual reality item in comparison to the first virtual reality item to determine if transfer acceptance has occurred. Other than this difference, the information regarding block 110 also applies to block 160 and is not repeated herein for brevity.

Figure 2:
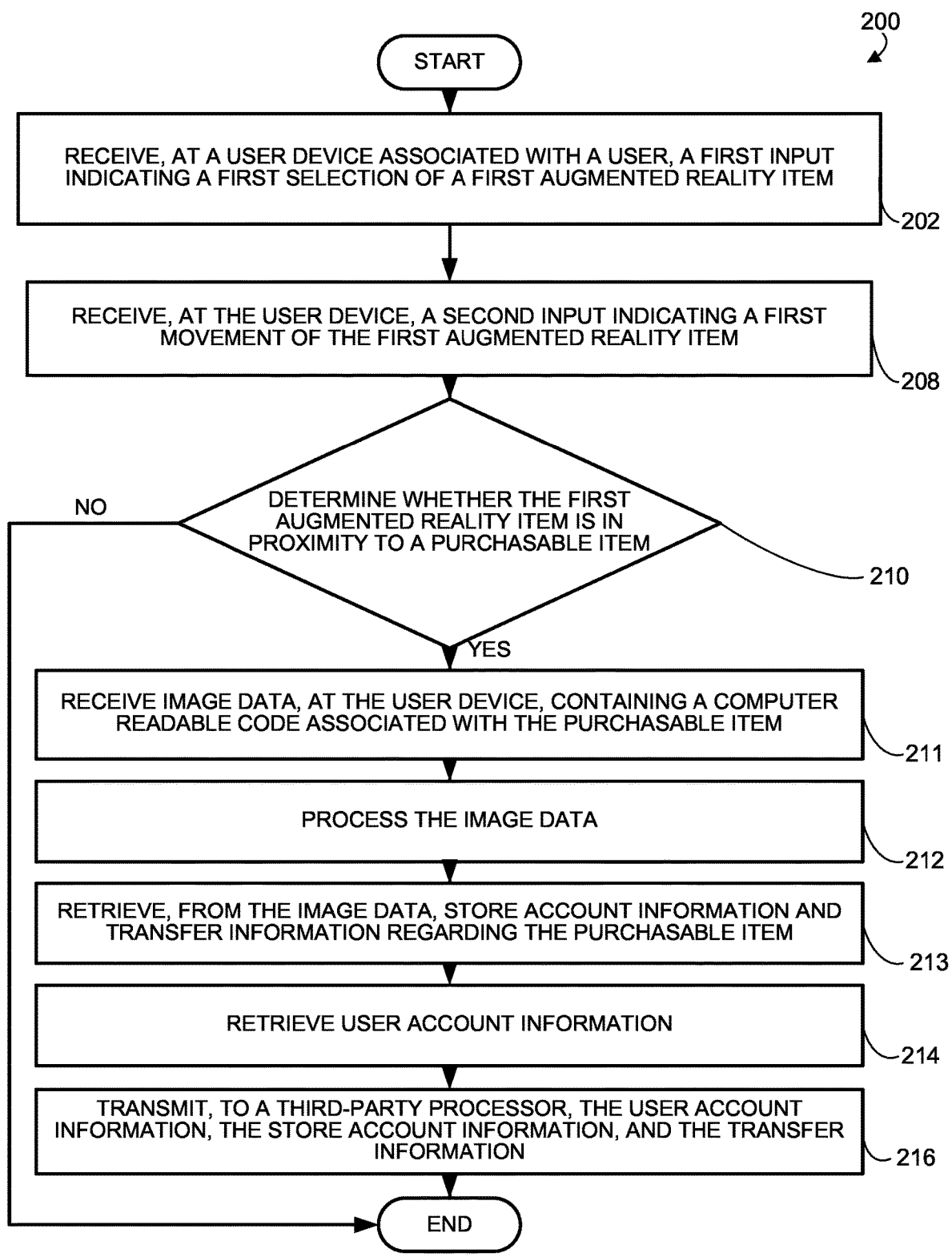
FIG. 2 is a flow diagram illustrating an exemplary method for currency transfer using augmented reality environments in accordance with certain embodiments of the disclosed technology.

In block 166, the first user device 402 may transmit, to a payment processor 430 indicated by the second user account information, the first user account information, the second user account information, and the transfer information. Unlike block 116, the payment processor 430 may be indicated by the second user account information. The second user account information may be used because the second user is the donor. Other than this difference, the information regarding block 116 also applies to block 166 and is not repeated herein for brevity FIG. 2 is a flow diagram illustrating an exemplary method 200 for currency transfer using augmented reality environments, in accordance with certain embodiments of the disclosed technology. The steps of method 200 may be performed by one or more components of the system 400 (e.g., currency transfer system 320 or web server 410 of augmented reality system 408 or user device 402), as described in more detail with respect to FIGS. 3 and 4. In this example, a first user pays for an item using the system.

Method 200 of FIG. 2 is similar to method 100 of FIG. 1A, except that method 200 may not include blocks 104, 106, and 107 of method 100. The descriptions of blocks 202 and 208 are similar to the respective descriptions of blocks 102 and 108 of method 100 and are not repeated herein for brevity. However, blocks 210, 212, 214, and 216 are different from blocks 110, 112, 114, and 116 and are described below. Additional blocks 211 and 213 are also described below.

In block 210, the first user device 402 may determine whether the first augmented reality item is in proximity to a purchasable item. Block 210 may generally be similar to block 110, except block 210 uses currency transfer system 320 to pay for an item that is for sale rather than making a peer-to-peer transfer. The second augmented item of block 110 is replaced by a purchasable item. The purchasable item may be an item that the buyer can purchase in the augmented environment (e.g., an augmented reality hat that is viewable to other users with an augmented reality device) or their physical environment (e.g., a soda or candy bar). The purchasable item may be located in an augmented reality-enhanced store. The user may need to place the augmented reality item near the purchasable item in order to accept the transfer. Alternatively, the user may need to touch the augmented reality item to the purchasable item to accept the transfer. As with block 210, there are many possible ways that the user may be able to accept the transfer. Other than these differences, the information regarding block 110 also applies to block 210 and is not repeated herein for brevity.

In block 211, the first user device 402 may receive image data, at the user device, containing a computer readable code associated with the purchasable item. The currency transfer system 320 may receive image data from a camera on user device 402 in response to determining that the transfer was accepted according to block 210. After determining the transfer was accepted, the camera may be used to search for a computer readable code that may be near the purchasable item. The currency transfer system 320 may prompt the user to look for and take an image of the code. The computer readable code may be positioned similarly to (e.g., hanging on the purchasable item) or be a price tag. The computer readable code may be a barcode or a QR code. Once the code is located, the currency transfer system 320 may use a camera on user device 402 to take a picture of the code. The currency transfer system 320 may give the user instructions to obtain a good image of the code via user device 402. If the user device 402 is not equipped with a camera, and the user has an additional method by which to upload the code, the currency transfer system 320 may allow the user to upload an image of the code. If the user does not have any alternative device, and the code is supplemented by an alphanumeric code, the currency transfer system 320 may allow the user to type in the alphanumeric code associated with computer readable code. Alternatively, the currency transfer system 320 may be able to read alphanumeric codes using optical character recognition (OCR). The code may also be a virtual QR code that is created by the purchasable item after the user accepts the transfer. The virtual QR code may be different for each user that accepts the transfer regarding the purchasable item. Placing the augmented reality item near the QR code, or touching the augmented reality item to the QR code, may also constitute acceptance of the transfer and allow the user to scan the QR code. The QR code may be present as a distinct item within the augmented environment that can be exposed or unlocked only for users after accepting a transfer. This creates an extra layer of security for shops, merchants, or stores within the augmented environment.

In block 212, the first user device 402 may process the image data. The image of the code may be processed using the hardware on user device 402 or a server. Processing the image may include filtering or other methods of correcting the image in order to compensate for potential distortions. Processing the image data may include using a machine learning model. The image data may include video data or multiple images.

In block 213, the first user device 402 may retrieve, from the image data, transfer information regarding the purchasable item and store account information. The computer readable code contained in the image data may contain a link to a location where the currency transfer system 320 may retrieve the transfer information regarding the purchasable item and the store account information. Alternatively, the computer readable code extracted from the image data may directly contain the transfer information and the store account information. The transfer information and store account information may be directly encoded into the computer readable code. If the code is a QR code, the QR code may be a secure QR code (e.g., an SQR code) which requires an encryption key to use. The encryption key may be provided in return to the user accepting the transfer.

Account information may include information necessary to move funds between users. Store account information may include payment information, such as a source of funds (e.g., bank account number), identification information (e.g., bank routing number, username), the payment platform (e.g., PayPal™, Venmo™), and/or contact information. Transfer information may include an assortment of necessary information regarding a fund transfer. The prompt may require the user to specify, the amount to transfer or the cost of the item (e.g., amount in dollars, amount in a cryptocurrency such as Bitcoin) and the payment platform (e.g., PayPal™, Venmo™). Transfer information, such as the price of the item, or the item's manufacturer or model number, may be displayed within the augmented reality environment when the user looks at the purchasable item. The transfer information may be displayed as a two-dimensional or three-dimensional text or figure. The text or figure containing the transfer information may be animated.

The transfer information and store account information may be retrieved in a variety of ways. Specifically, the transfer information and store account information may be stored on database 360 or database 416. The currency transfer system 320 may be able to retrieve the transfer information and store account information from the databases. Alternatively, the transfer information and store account information may be stored securely on a 3$^{rd}$ party server that the currency transfer system 320 can access through a network.

In block 214, the first user device 402 may retrieve the user account information. This may be largely similar to block 112 but may not contain transfer information. Other than this difference, the information regarding block 112 also applies to block 214 and is not repeated herein for brevity.

In block 216, the first user device 402 may transmit, to a payment processor 430, the user account information, the store account information, and the transfer information. The payment processor may be determined by the account information of the user or the account information of the store. After receiving a confirmation that the payment has processed successfully, the currency transfer system 320 may send a signal to the store that the payment was processed. Alternatively, the store may receive its own indication from the payment processor 430 that the payment was processed. The signal from the currency transfer system 320 may include a direction to the store to vend or prepare the item. For example, if the purchasable item is a candy bar, the currency transfer system 320 may send a signal to the store to vend the candy bar at a machine. Alternatively, if the store is a restaurant, and the purchasable item is food, the vend signal from currency transfer system 320 may be an indication to the kitchen at the restaurant to begin to cook the meal. Furthermore, additional information regarding block 116 also applies to block 216 and is not repeated herein for brevity.

Figure 3:
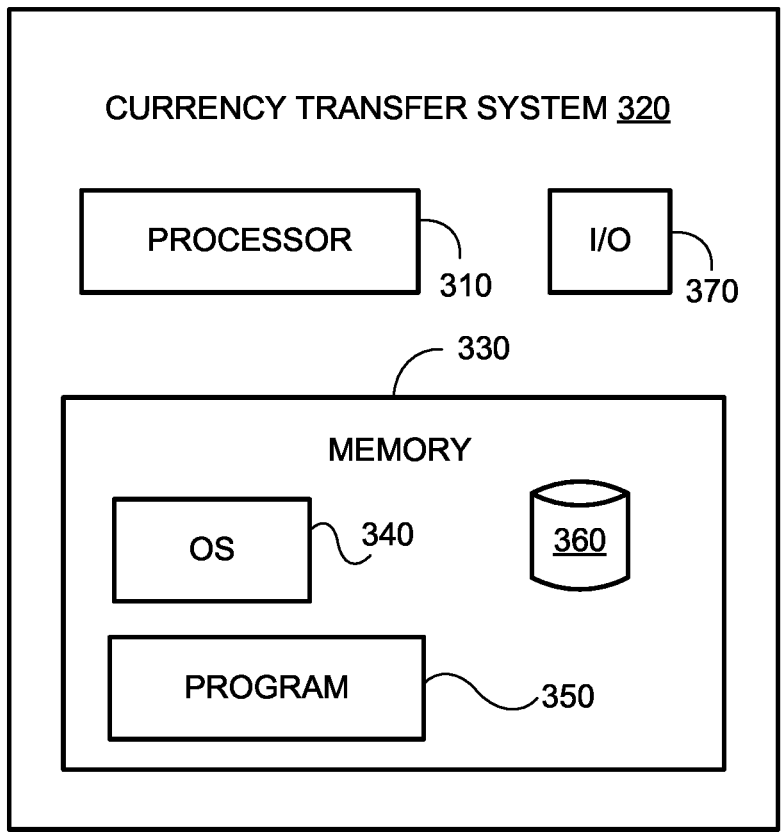
FIG. 3 is block diagram of an example currency transfer system used to provide currency transfer using augmented reality environments, according to an example implementation of the disclosed technology.
Figure 4:
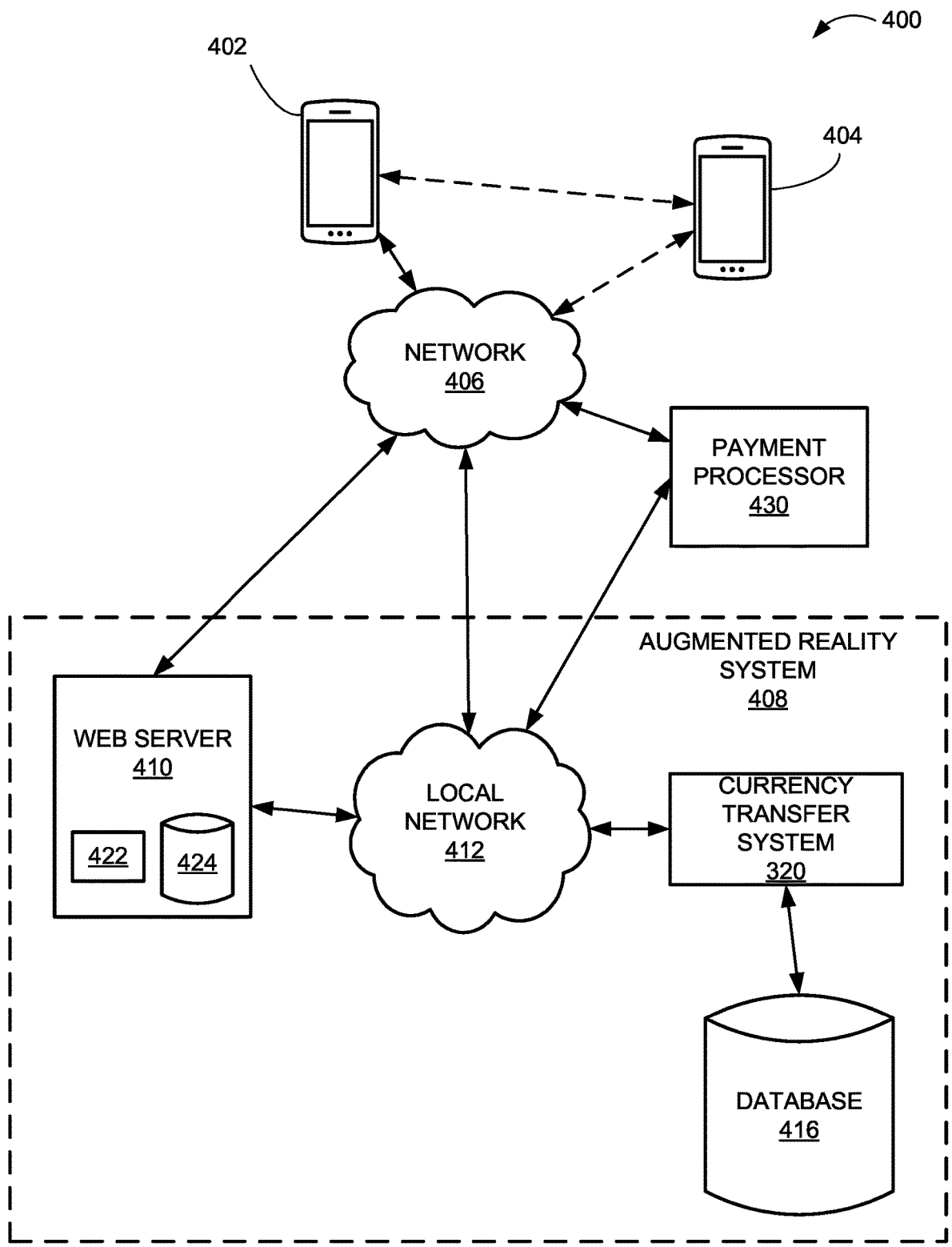
FIG. 4 is block diagram of an example system that may be used to provide currency transfer using augmented reality environments, according to an example implementation of the disclosed technology.

FIG. 3 is a block diagram of an example currency transfer system 320 used to aid users in transferring currency according to an example implementation of the disclosed technology. According to some embodiments, the user device 402 and web server 410, as depicted in FIG. 4 and described below, may have a similar structure and components that are similar to those described with respect to currency transfer system 320 shown in FIG. 3. Currency transfer system 320 may operate completely or in part on the user AR device 402. In other words, the AR device 402 may be programmed to perform the same or some of the functions and components described herein with respect to currency transfer system 320. In some embodiments, the AR device 402 operates as the currency transfer system 320 eliminating the need for a separate currency transfer system. As shown, the currency transfer system 320 may include a processor 310, an input/output (I/O) device 370, a memory 330 containing an operating system (OS) 340 and a program 350. In certain example implementations, the currency transfer system 320 may be a single server or may be configured as a distributed computer system including multiple servers or computers that interoperate to perform one or more of the processes and functionalities associated with the disclosed embodiments. In some embodiments currency transfer system 320 may be one or more servers from a serverless or scaling server system. In some embodiments, the currency transfer system 320 may further include a peripheral interface, a transceiver, a mobile network interface in communication with the processor 310, a bus configured to facilitate communication between the various components of the currency transfer system 320, and a power source configured to power one or more components of the currency transfer system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the currency transfer system 320 may include one or more storage devices configured to store information used by the processor 310 (or other components) to perform certain functions related to the disclosed embodiments. In one example, the currency transfer system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The currency transfer system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the currency transfer system 320 may include the memory 330 that may include one or more programs 350 to perform one or more functions of the disclosed embodiments. For example, in some embodiments, the currency transfer system 320 may additionally manage dialogue and/or other interactions with the customer via a program 350.

The processor 310 may execute one or more programs 350 located remotely from the currency transfer system 320. For example, the currency transfer system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a currency transfer system database 360 for storing related data to enable the currency transfer system 320 to perform one or more of the processes and functionalities associated with the disclosed embodiments.

The currency transfer system database 360 may include stored data relating to status data (e.g., average session duration data, location data, idle time between sessions, and/or average idle time between sessions) and historical status data. According to some embodiments, the functions provided by the currency transfer system database 360 may also be provided by a database that is external to the currency transfer system 320, such as the database 416 as shown in FIG. 4.

The currency transfer system 320 may also be communicatively connected to one or more memory devices (e.g., databases) locally or through a network. The remote memory devices may be configured to store information and may be accessed and/or managed by the currency transfer system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The currency transfer system 320 may also include one or more I/O devices 370 that may comprise one or more interfaces for receiving signals or input from devices and providing signals or output to one or more devices that allow data to be received and/or transmitted by the currency transfer system 320. For example, the currency transfer system 320 may include interface components, which may provide interfaces to one or more input devices, such as one or more keyboards, mouse devices, touch screens, track pads, trackballs, scroll wheels, digital cameras, microphones, sensors, and the like, that enable the currency transfer system 320 to receive data from a user (such as, for example, via the user device 402).

In examples of the disclosed technology, the currency transfer system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the currency transfer system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the currency transfer system 320 may include a greater or lesser number of components than those illustrated.

FIG. 4 is a block diagram of an example system that may be used to use and interact with augmented reality system 408, according to an example implementation of the disclosed technology. The components and arrangements shown in FIG. 4 are not intended to limit the disclosed embodiments as the components used to implement the disclosed processes and features may vary. As shown, augmented reality system 408 may interact with a user device 402 via a network 406. In certain example implementations, the augmented reality system 408 may include a local network 412, a currency transfer system 320, a web server 410, and a database 416. Augmented reality system 408 may operate completely or in part on user device 402.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the augmented reality system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the augmented reality system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The user device 402 may be an AR device may include one or more displays and one or more cameras. The displays may be at least partially see-through and allow the device to display images on top of the user's physical environment. The AR device may also include an array of sensors, including, for example cameras to watch the user's environment, cameras to watch the user's actions or impressions (e.g., facial expressions or blinking), microphones to listen to user or the user's environment, accelerometers, gyrometers, fingerprint scanners, retinal scanners, and other similar sensors known in the art. The AR device may contain tactile control devices such as a joystick. The AR device may also include the ability to communicate using near field communication (NFC), Bluetooth™, WiFi™, cellular data or other technologies known in the art. The AR device may be linked with the user's cell phone. The AR device may be running software that allows it to uniquely interface with augmented reality system 408. AR system 408 and currency transfer system 320 may be able to interact directly with the sensors on AR device. User device 402 may contain all hardware and software associated with currency transfer system 320 and augmented reality system 408. User device 402 may be able to run currency transfer system 320 and augmented reality system 408 without additional hardware. User device 402 may be a first user device 402.

The system may also include second user device 404, which may be the same as, have any the same features as, or be similar to user device 402. The second user device 404 may not contain currency transfer system 320. The second user device 404 may have its own augmented reality system 408. The second user device 404 may be to connect directly with first user device 402 using near field communication (NFC), Bluetooth™, WiFi™, or cellular data. This may allow second user device 404 to sent direct messages to currency transfer system 320, if currency transfer system 320 is operating on the hardware of first user device 402. Alternatively, if currency transfer system 320 is operating on a server, or not on the hardware of first user device 402, the second user device 404 may interact with the server through the network 406. User devices 402, 404 may have similar hardware to currency transfer system 320. Although user devices 402, 404 are depicted in FIG. 4 as smart phones, they may also be virtual reality or augmented reality headsets or other types of AR/VR devices.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The augmented reality system 408 may be associated with and optionally controlled by one or more entities such as a business, corporation, individual, partnership, or any other entity that provides one or more of goods, services, and consultations to individuals such as customers. In some embodiments, the augmented reality system 408 may be controlled by a third party on behalf of another business, corporation, individual, partnership. The augmented reality system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the currency transfer system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the augmented reality system 408 to interact with one another and to connect to the network 406 for interacting with components in the system 400 environment. In some embodiments, the local network 412 may include an interface for communicating with or linking to the network 406. In other embodiments, certain components of the augmented reality system 408 may communicate via the network 406, without a separate local network 406.

The augmented reality system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access augmented reality system 408 using the cloud computing environment. User device 402 may be able to access augmented reality system 408 using specialized software. The cloud computing environment may eliminate the need to install specialized software on user device 402.

In accordance with certain example implementations of the disclosed technology, the augmented reality system 408 may include one or more computer systems configured to compile data from a plurality of sources the currency transfer system 320, web server 410, and/or the database 416. The currency transfer system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Figure 5:
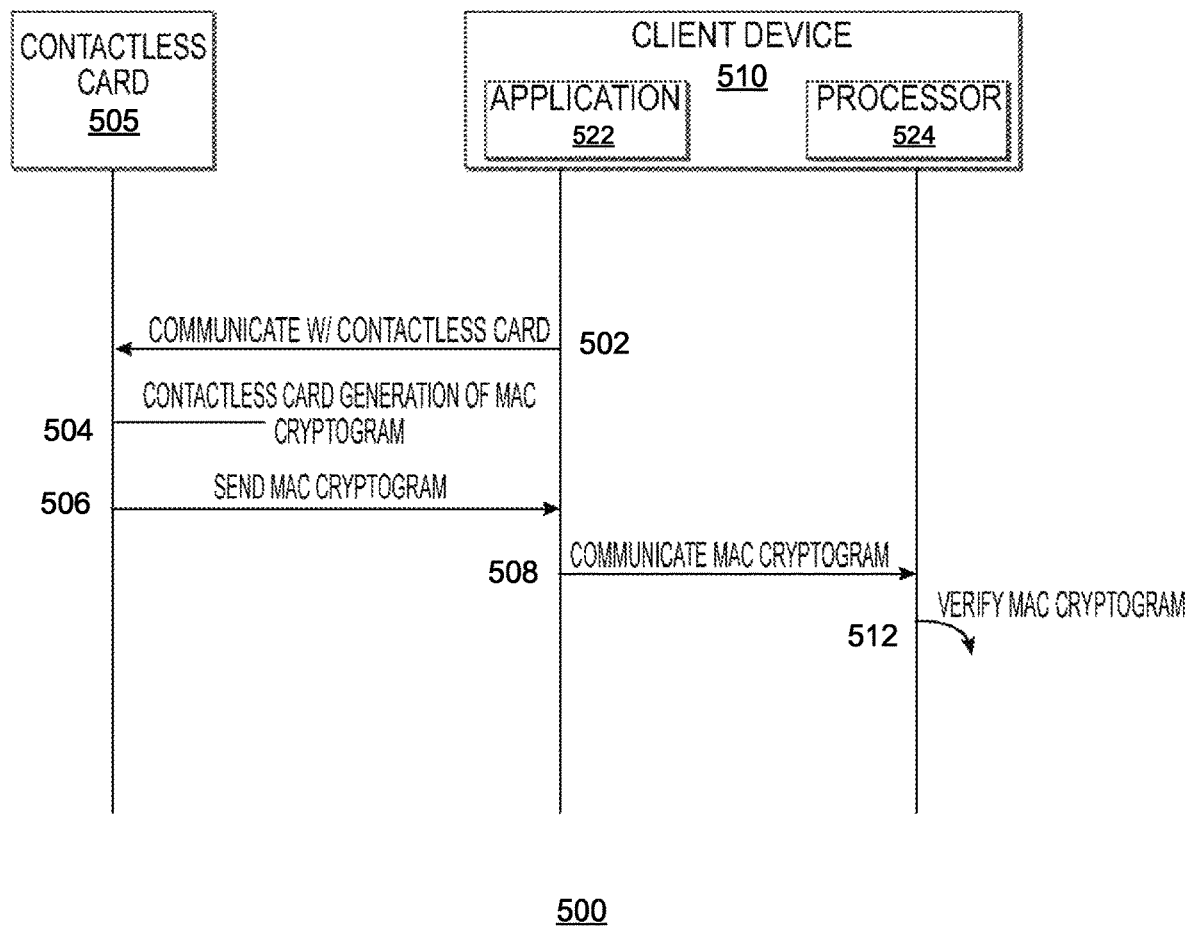
FIG. 5 is a timing diagram of an example system that may be used to provide authentication information to a mobile device from a contactless card, according to an example implementation of the disclosed technology.

FIG. 5 is a timing diagram illustrating an example sequence for providing authentication information to a client device 510 (e.g., user device 402) via a contactless transaction card. System 500 may comprise contactless card 505 and client device 510, which may include an application 522 and processor 524. The contactless card 505 may also be capable of executing transactions.

At step 502, the application 522 may communicate with the contactless card 505 (e.g., after being brought near the contactless card 505). Communication between the application 522 and the contactless card 505 may involve the contactless card 505 being sufficiently close to a card reader (not shown) of the client device 510 to enable NFC data transfer between the application 522 and the contactless card 505.

At step 504, after communication has been established between client device 510 and contactless card 505, the contactless card 505 generates a message authentication code (MAC) cryptogram. In some examples, this may occur when the contactless card 505 is read by the application 522. In particular, this may occur upon a read, such as an NFC read, of a near field data exchange (NDEF) tag, which may be created in accordance with the NFC Data Exchange Format. For example, a reader, such as application 522, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 505 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 522 may be configured to transmit a request to contactless card 505, the request comprising an instruction to generate a MAC cryptogram.

At step 506, the contactless card 505 sends the MAC cryptogram to the application 522. In some examples, the transmission of the MAC cryptogram occurs via NFC, however, the present disclosure is not limited thereto. In other examples, this communication may occur via Bluetooth, Wi-Fi, or other means of wireless data communication.

At step 508, the application 522 communicates the MAC cryptogram to the processor 524.

At step 512, the processor 524 verifies the MAC cryptogram pursuant to an instruction from the application 522. For example, the MAC cryptogram may be verified, as explained below.

In some examples, verifying the MAC cryptogram may be performed by a device other than client device 510, such as a server in data communication with the client device. For example, processor 524 may output the MAC cryptogram for transmission to server, which may verify the MAC cryptogram.

In some examples, the MAC cryptogram may function as a digital signature for purposes of verification or for identity authentication. Other digital signature algorithms, such as public key asymmetric algorithms, e.g., the Digital Signature Algorithm and the RSA algorithm, or zero knowledge protocols, may be used to perform this verification.

Figure 6:
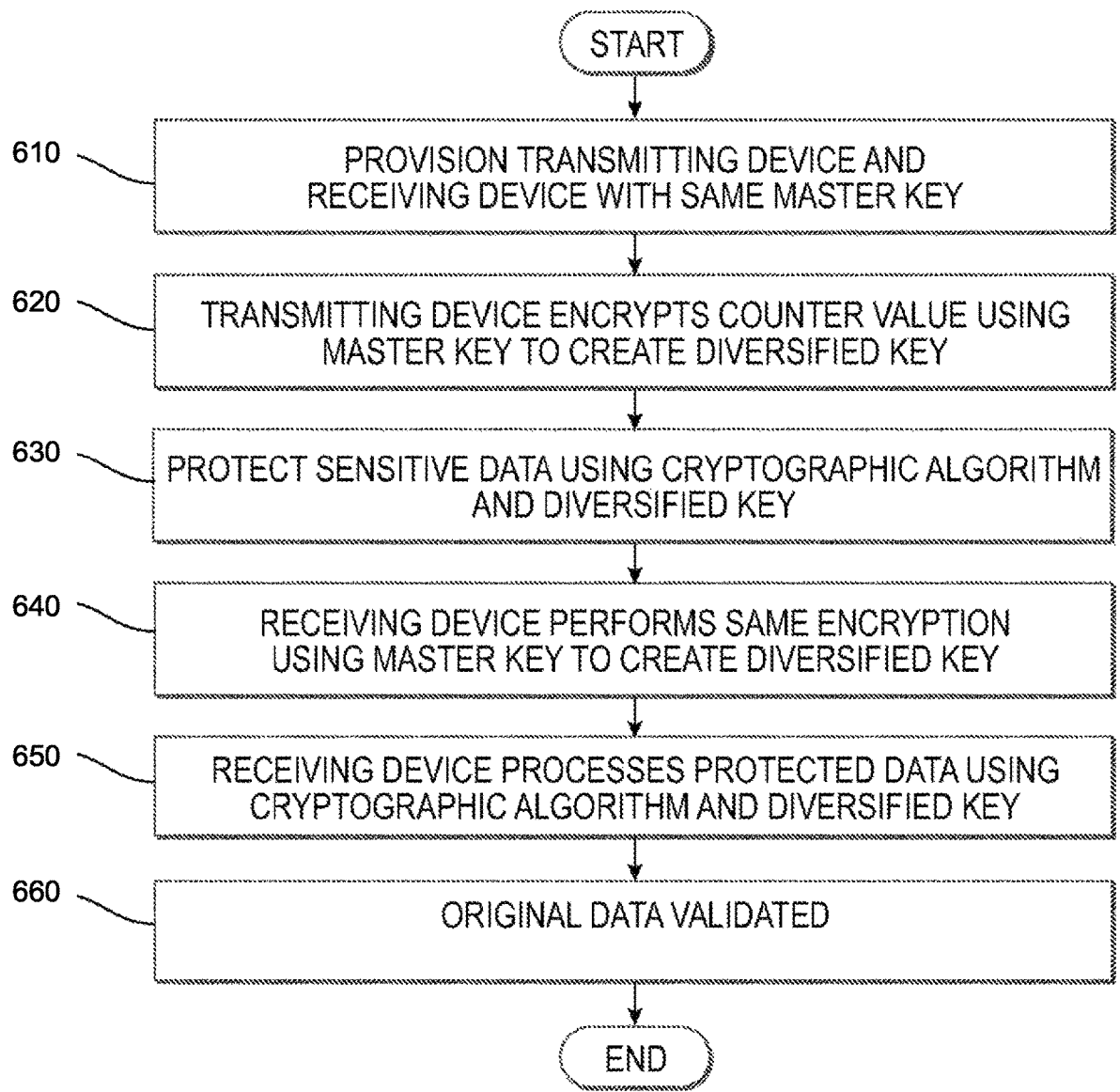
FIG. 6 is a method of key diversification that may be used to provide authentication information to a mobile device from a contactless card, according to an example implementation of the disclosed technology.

FIG. 6 illustrates a method 600 of key diversification according to an example of the present disclosure for providing authentication information to a receiving device (e.g., user device 402) via a contactless transaction card. Method 600 may include a transmitting device and receiving device similar to contactless card 505 and client device 510 referenced in FIG. 5.

For example, a sender and recipient may desire to exchange data (e.g., original sensitive data) via a transmitting device and a receiving device. As explained above, although these two parties may be included, it is understood that one or more transmitting devices and one or more receiving devices may be involved so long as each party shares the same shared secret symmetric key. In some examples, the transmitting device and receiving device may be provisioned with the same master symmetric key. Further, it is understood that any party or device holding the same secret symmetric key may perform the functions of the transmitting device and similarly any party holding the same secret symmetric key may perform the functions of the receiving device. In some examples, the symmetric key may comprise the shared secret symmetric key which is kept secret from all parties other than the transmitting device and the receiving device involved in exchanging the secure data. It is further understood that both the transmitting device and receiving device may be provided with the same master symmetric key, and further that part of the data exchanged between the transmitting device and receiving device comprises at least a portion of data which may be referred to as the counter value. The counter value may comprise a number that changes each time data is exchanged between the transmitting device and the receiving device.

At block 610, a transmitting device and receiving device may be provisioned with the same master key, such as the same master symmetric key. When the transmitting device is preparing to process the sensitive data with symmetric cryptographic operation, the sender may update a counter. In addition, the transmitting device may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm, such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

The transmitting device may take the selected cryptographic algorithm, and using the master symmetric key, process the counter value. For example, the sender may select a symmetric encryption algorithm, and use a counter which updates with every conversation between the transmitting device and the receiving device.

At block 620, the transmitting device may then encrypt the counter value with the selected symmetric encryption algorithm using the master symmetric key, creating a diversified symmetric key. The diversified symmetric key may be used to process the sensitive data before transmitting the result to the receiving device. For example, the transmitting device may encrypt the sensitive data using a symmetric encryption algorithm using the diversified symmetric key, with the output comprising the protected encrypted data. The transmitting device may then transmit the protected encrypted data, along with the counter value, to the receiving device for processing. In some examples, a cryptographic operation other than encryption may be performed, and a plurality of cryptographic operations may be performed using the diversified symmetric keys prior to transmittal of the protected data.

In some examples, the counter value may not be encrypted. In these examples, the counter value may be transmitted between the transmitting device and the receiving device at block 420 without encryption.

At block 630, sensitive data may be protected using one or more cryptographic algorithms and the diversified keys. The diversified session keys, which may be created by the key diversification which uses the counter, may be used with one or more cryptographic algorithms to protect the sensitive data. For example, data may be processed by a MAC using a first diversified session key, and the resulting output may be encrypted using the second diversified session key producing the protected data.

At block 640, the receiving device may perform the same symmetric encryptions using the counter value as input to the encryptions and the master symmetric keys as the keys for the encryption. The output of the encryptions may be the same diversified symmetric key values that were created by the sender. For example, the receiving device may independently create its own copies of the first and second diversified session keys using the counter. Then, the receiving device may decrypt the protected data using the second diversified session key to reveal the output of the MAC created by the transmitting device. The receiving device may then process the resultant data through the MAC operation using the first diversified session key.

At block 650, the receiving device may use the diversified keys with one or more cryptographic algorithms to validate the protected data.

At block 660, the original data may be validated. If the output of the MAC operation (via the receiving device using the first diversified session key) matches the MAC output revealed by decryption, then the data may be deemed valid.

The next time sensitive data needs to be sent from the transmitting device to the receiving device, a different counter value may be selected, which produces a different diversified symmetric key. By processing the counter value with the master symmetric key and same symmetric cryptographic algorithm, both the transmitting device and receiving device may independently produce the same diversified symmetric key. This diversified symmetric key, not the master symmetric key, is used to protect the sensitive data.

As explained above, both the transmitting device and receiving device each initially possess the shared master symmetric key. The shared master symmetric key is not used to encrypt the original sensitive data. Because the diversified symmetric key is independently created by both the transmitting device and receiving device, it is never transmitted between the two parties. Thus, an attacker cannot intercept the diversified symmetric key and the attacker never sees any data which was processed with the master symmetric key. Only the small counter value is processed with the master symmetric key, not the sensitive data. As a result, reduced side-channel data about the master symmetric key is revealed. Moreover, the sender and the recipient may agree, for example by prior arrangement or other means, how often to create a new diversification value, and therefore a new diversified symmetric key. In an embodiment, a new diversification value and therefore a new diversified symmetric key may be created for every exchange between the transmitting device and receiving device.

In some examples, the key diversification value may comprise the counter value. Other non-limiting examples of the key diversification value include: a random nonce generated each time a new diversified key is needed, the random nonce sent from the transmitting device to the receiving device; the full value of a counter value sent from the transmitting device and the receiving device; a portion of a counter value sent from the transmitting device and the receiving device; a counter independently maintained by the transmitting device and the receiving device but not sent between the two; a one-time-passcode exchanged between the transmitting device and the receiving device; cryptographic hash of the sensitive data. In some examples, one or more portions of the key diversification value may be used by the parties to create multiple diversified keys. For example, a counter may be used as the key diversification value.

In another example, a portion of the counter may be used as the key diversification value. If multiple master key values are shared between the parties, the multiple diversified key values may be obtained by the system and processes described herein. A new diversification value, and therefore a new diversified symmetric key, may be created as often as needed. In the most secure case, a new diversification value may be created for each exchange of sensitive data between the transmitting device and the receiving device. In effect, this may create a one-time use key, such as a single session key.

In other examples, such as to limit the number of times of use of the master symmetric key, it may be agreed upon by the sender of transmitting device and recipient of the receiving device that a new diversification value, and therefore a new diversified symmetric key, will happen only periodically. In one example, this may be after a pre-determined number of uses, such as every 10 transmissions between the transmitting device and the receiving device. In another example, this may be after a certain time period, a certain time period after a transmission, or on a periodic basis (e.g., daily at a designated time; weekly at a designated time on a designated day). In another example, this may be every time the receiving device signals to the transmitting device that it desires to change the key on the next communication. This may be controlled on policy and may be varied due to, for example, the current risk level perceived by the recipient of the receiving device.

Figure 7:
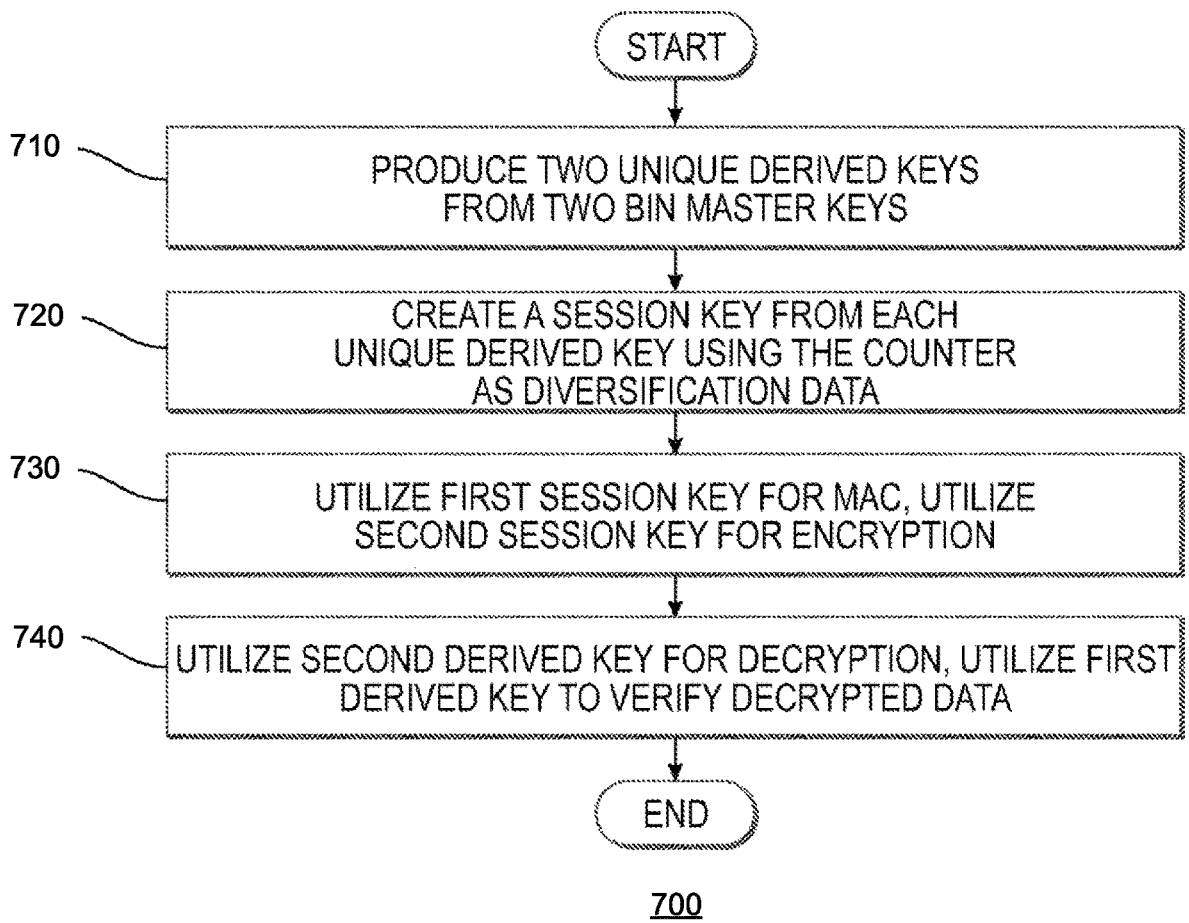
FIG. 7 illustrates key operations that may be used to provide authentication information to a mobile device from a contactless card, according to an example implementation of the disclosed technology.

FIG. 7 is a flowchart illustrating key operations 700 according to an example embodiment for providing authentication information to a client device 510 (e.g., user device 402) via a contactless transaction card. As illustrated in FIG. 7, at block 710, two bank identifier number (BIN) level master keys may be used in conjunction with the account identifier and card sequence number to produce two unique derived keys (UDKs) per card. In some examples, a bank identifier number may comprise one number or a combination of one or more numbers, such as an account number or an unpredictable number provided by one or more servers, may be used for session key generation and/or diversification. The UDKs (AUTKEY and ENCKEY) may be stored on the card during the personalization process.

At block 720, the counter may be used as the diversification data, since it changes with each use and provides a different session key each time, as opposed to the master key derivation in which one unique set of keys per card is produced. In some examples, it is preferable to use the 4-byte method for both operations. Accordingly, at block 720, two session keys may be created for each transaction from the UDKs, i.e., one session key from AUTKEY and one session key from ENCKEY. In the card, for the MAC key (i.e., the session key created from AUTKEY), the low order of two bytes of the OTP counter may be used for diversification. For the ENC key (i.e., the session key created from ENCKEY), the full length of the OTP counter may be used for the ENC key.

At block 730, the MAC key may be used for preparing the MAC cryptogram, and the ENC key may be used to encrypt the cryptogram. For example, the MAC session key may be used to prepare the cryptogram, and the result may be encrypted with the ENC key before it is transmitted to the one or more servers.

At block 740, verification and processing of the MAC is simplified because 2-byte diversification is directly supported in the MAC authentication functions of payment HSMs. Decryption of the cryptogram is performed prior to verification of the MAC. The session keys are independently derived at the one or more servers, resulting in a first session key (the ENC session key) and a second session key (the MAC session key). The second derived key (i.e., the ENC session key) may be used to decrypt the data, and the first derived key (i.e., the MAC session key) may be used to verify the decrypted data.

For the contactless card, a different unique identifier is derived which may be related to the application primary account number (PAN) and PAN sequence number, which is encoded in the card. The key diversification may be configured to receive the identifier as input with the master key such that one or more keys may be created for each contactless card. In some examples, these diversified keys may comprise a first key and a second key. The first key may include an authentication master key (Card Cryptogram Generation/Authentication Key—Card-Key-Auth), and may be further diversified to create a MAC session key used when generating and verifying a MAC cryptogram. The second key may comprise an encryption master key (Card Data Encryption Key—Card-Key-DEK), and may be further diversified to create an ENC session key used when encrypting and decrypting enciphered data. In some examples, the first and the second keys may be created by diversifying the issuer master keys by combining them with the card's unique ID number (pUID) and the PAN sequence number (PSN) of a payment applet. The pUID may comprise a 16-digit numerical value. As explained above, pUID may comprise a 16 digit BCD encoded number. In some examples, pUID may comprise a 14-digit numerical value.

In some examples, since the EMV session key derivation method may wrap at 2^16 uses, the counter such as the full 32-bit counter may be added to the initialization arrays of the diversification method.

In other examples, such as credit cards, a number, such as an account number or an unpredictable number provided by one or more servers, may be used for session key generation and/or diversification.

Figure 8:
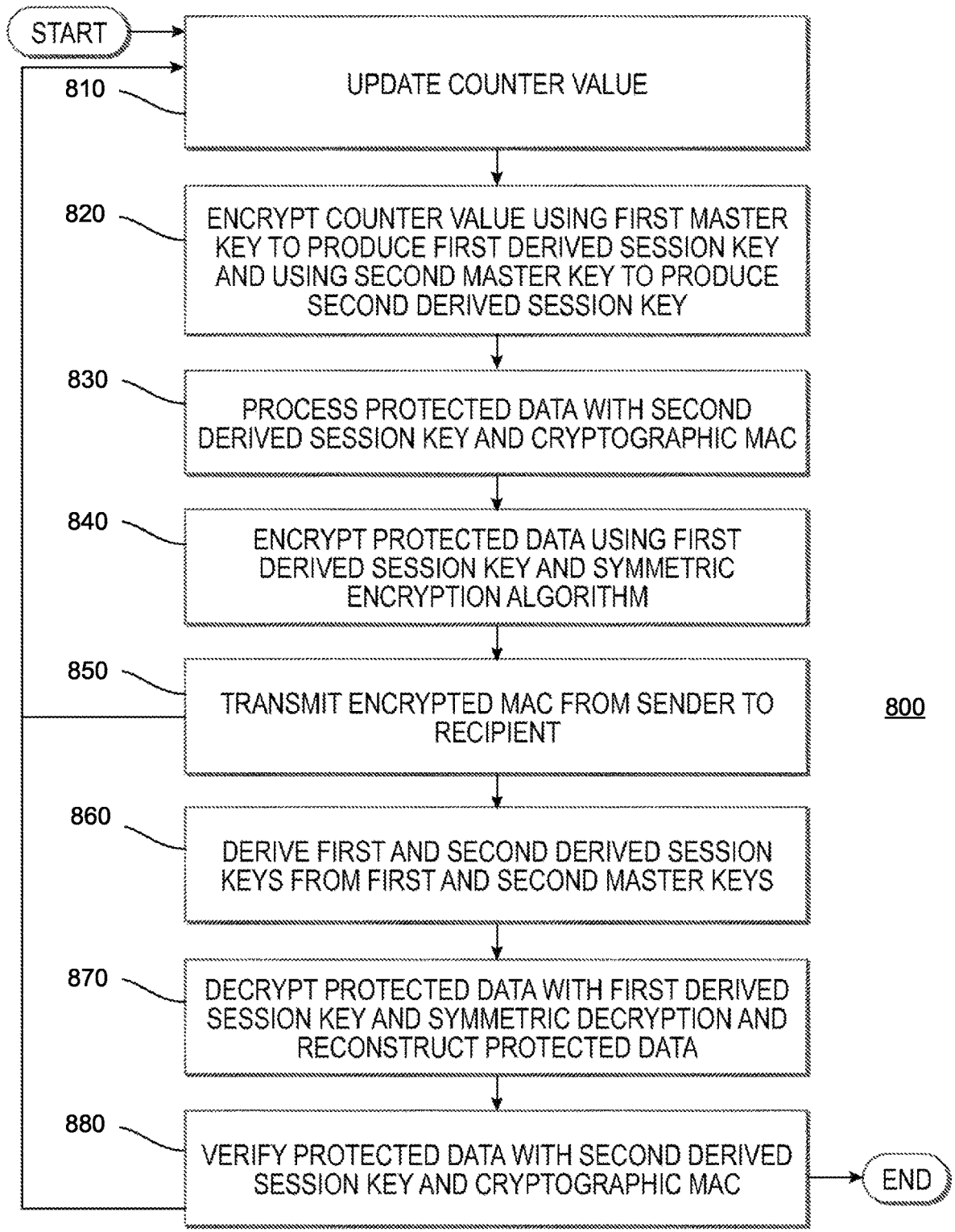
FIG. 8 is a method of key diversification that may be used to provide authentication information to a mobile device from a contactless card, according to an example implementation of the disclosed technology.

FIG. 8 depicts an exemplary process 800 illustrating key diversification according to one example for providing authentication information to a client device 510 (e.g., user device 402) via a contactless transaction card. Initially, a sender (e.g., a transaction card) and the recipient (e.g., user device 402) may be provisioned with two different master keys. For example, a first master key may comprise the data encryption master key, and a second master key may comprise the data integrity master key. The sender has a counter value, which may be updated at block 810, and other data, such as data to be protected, which it may secure share with the recipient.

At block 820, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 830, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 840, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 850, the encrypted MAC is transmitted, from the sender to the recipient, with sufficient information to identify additional secret information (such as shared secret, master keys, etc.), for verification of the cryptogram.

At block 860, the recipient uses the received counter value to independently derive the two derived session keys from the two master keys as explained above.

At block 870, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 880, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 810) and a new set of session keys may be created (at block 820). In some examples, the combined random data may be discarded.

Example embodiments of systems and methods described herein may be configured to provide security factor authentication. The security factor authentication may comprise a plurality of processes. As part of the security factor authentication, a first process may comprise logging in and validating a user via one or more applications executing on a device (e.g., user device 402). As a second process, the user may, responsive to successful login and validation of the first process via the one or more applications, engage in one or more behaviors associated with one or more contactless cards. In effect, the security factor authentication may include both securely proving identity of the user and engaging in one or more types of behaviors, including but not limited to one or more tap gestures, associated with the contactless card. In some examples, the one or more tap gestures may comprise a tap of the contactless card by the user to a device (e.g., user device 402).

In some examples, the contactless card may be tapped to a device, such user device 402, to verify identity so as to receive a transactional item responsive to a purchase or transfer. For example, an encrypted transaction may occur between the contactless card and the device, which may be configured to process one or more tap gestures. As explained above, the one or more applications may be configured to validate identity of the user and then cause the user to act or respond to it, for example, via one or more tap gestures. In some examples, data for example, may be written back to the contactless card. In some embodiments, the example authentication communication protocol may mimic an offline dynamic data authentication protocol of the EMV standard that is commonly performed between a transaction card and a point-of-sale device, with some modifications.

In some examples, the contactless card may be tapped to a device, such as a mobile device. As explained above, identity of the user may be verified by the one or more applications which would then grant the user a desired benefit based on verification of the identity.

Example Use Case

The following example use case describes an example of a typical user flow pattern. This section is intended solely for explanatory purposes and not in limitation.

In one example, a user, Chris, has an augmented reality headset. Chris is in a park and sees John, a friend of his, who is also wearing an augmented reality headset. Chris talks with John and decides to give John $10. Using his augmented reality headset and via one or more user inputs or gestures recognized by one or more cameras and/or sensors of the augmented reality headset, Chris opens his augmented reality inventory and selects a transaction card (the first augmented reality item) (block 102). After selecting the transaction card, a prompt opens on the display of Chris' augmented reality headset asking Chris for an amount and to choose an account. Using his augmented reality headset and via one or more user inputs or gestures recognized by one or more cameras and/or sensors of the augmented reality headset, Chris chooses a denomination of US dollars, an amount of $10 from his checking account, nicknamed "Chris' Checking" (block 104). Meanwhile, John opens his augmented reality inventory and, via one or more user inputs or gestures recognized by one or more cameras and/or sensors of the augmented reality headset, selects a wallet (the second augmented reality item) (block 106). John's user account is setup to automatically have all transactions go into his PayPal account. Both user's having selected a virtual reality item, the currency transfer system 320, operating on Chris' headset, establishes a connection between Chris' augmented reality headset and John's augmented reality headset. John's wallet is now viewable by him and Chris in the augmented reality environment via their respective augmented reality headsets (block 107). Chris sees, through his display of this augmented reality headset, John's wallet via his augmented reality headset. Chris moves his transaction card to be right on top of or next to John's wallet (block 108). A message pops up, on both of Chris' and John's augmented reality headset displays, to "Hold for 5 seconds to transfer" with a timer graphic with a second hand counting down from five (5). After holding the position, another message pops up on both of Chris' and John's augmented reality headset displays indicating "Transfer Accepted" (block 110). At this time, John's PayPal username is sent to Chris' augmented reality headset (block 114). Currency transfer system 320 retrieves or receives Chris' account information from internal storage (block 112). The currency transfer system 320 then determines that Chris' needs to authorize this transaction. Chris sees a prompt on his display asking him to authenticate the transaction. Chris makes an authentication gesture (e.g., two thumbs up) which is recorded by his augmented reality headset. Chris' augmented reality headset receives the information regarding the authentication gesture and determines that it is a match to a stored authentication gesture. Chris' augmented reality headset then sends Chris' and John's account information and the transaction information, along with information that Chris was authenticated, to the payment processor 430 (block 116). The payment processor 430 processes the transfer and sends a notification to the currency transfer system 320 regarding the completion of the transfer. The currency transfer system 320 then sends a notification to Chris' augmented reality headset that the transfer has been completed, which Chris' augmented reality headset then relays to John's augmented reality headset. The connection between Chris' augmented reality headset and John's augmented reality headset is then terminated.

In another example, Chris is in an augmented reality environment and sees a candy bar he would like to eat in a vending machine. Chris decides to buy the candy bar. Using his augmented reality headset, Chris opens his augmented reality inventory and selects a transaction card (the first augmented reality item) using one or more user inputs or gestures recognized by the augmented reality headset (block 202). Chris moves his transaction card to be in front of the machine using one or more user input devices or gestures recognized by the virtual reality headset (block 208). A message pops up on the headset to "Hold for 5 seconds to purchase" with a timer graphic with a second hand counting down from five (5) (block 210). After holding the position, the camera in Chris' augmented reality headset captures a picture of a QR code located on the venting machine (block 211). The augmented reality headset processes the image data (block 212) to reveal store account information and transfer information regarding the candy bar (block 213). Chris' routing number and account number are retrieved by Chris' augmented reality headset 402 (block 214). Chris' augmented reality headset then sends Chris' information and the store's account information and the transfer information to the payment processor 430 (block 216). The payment processor 430 processes the transfer and then sends a notification to Chris' augmented reality headset that the transfer has been completed. The payment processor 430 also notifies the vending machine that the transfer has been completed. The machine then vends a candy bar for Chris.

In some examples, disclosed systems or methods may involve one or more of the following clauses:

Clause 1: A first augmented reality device comprising: one or more displays; one or more processors; memory in communication with the one or more processors and storing instructions that are configured to cause the device to: receive a first input indicating a first selection of a first augmented reality item associated with a first user; receive transfer information comprising an amount to transfer to a second user; receive, from a second user device, a second augmented reality item associated with the second user; display the first augmented reality item and the second augmented reality item via the one or more displays; receive a second input associated with a first movement of the first augmented reality item; determine whether the first augmented reality item is in proximity to the second augmented reality item; responsive to determining the first augmented reality item is in proximity to the second augmented reality item, initiate a peer-to-peer transfer by: retrieving first user account information associated with the first user; receiving, from the second user device, second user account information; and transmitting, to an account processor indicated by the first user account information, the first user account information, the second user account information, and the transfer information.

Clause 2: The first augmented reality device of clause 1, wherein the first augmented reality item is in proximity to the second augmented reality item when the first augmented reality item contacts the second augmented reality item in an augmented reality space.

Clause 3: The first augmented reality device of clause 1, wherein the first user account information further comprises a first identification and a first platform of the first user, and wherein the second user account information further comprises a second identification and a second platform of the second user.

Clause 4: The first augmented reality device of clause 1, wherein: the first augmented reality item is a payment instrument; and the second augmented reality item is a wallet.

Clause 5: The first augmented reality device of clause 1, wherein the memory storing further instructions that are configured to cause the device to: prior to initiating the peer-to-peer transfer, generate and display a confirmation request and receive a confirmation from the first user.

Clause 6: The first augmented reality device of clause 1, wherein determining whether the first augmented reality item is in proximity to the second augmented reality item further comprises: measuring a distance from the first augmented reality item to the second augmented reality item; and determining whether the distance is less than a predetermined threshold for a predetermined amount of time.

Clause 7: The first augmented reality device of clause 1, wherein receiving the second augmented reality item further comprises receiving, from a headset of the second user, a message indicating the second user selecting the second augmented reality item.

Clause 8: The first augmented reality device of clause 1, wherein the memory storing further instructions that are configured to cause the device to: generate and display a prompt to the first user on the one or more displays to confirm the second augmented reality item from an unknown contact may be displayed; and receive a third user input confirming that the second augmented reality item may be displayed on the one or more displays.

Clause 9: A first augmented reality device comprising: one or more displays; one or more processors; memory in communication with the one or more processors and storing instructions that are configured to cause the device to: receive a first input indicating a first selection of a first augmented reality item of a first user; receive transfer information comprising an amount to request from a second user; receive, from a second user device, a second augmented reality item of the second user; display the first augmented reality item and the second augmented reality item via the one or more displays; receive, from the second user device, a second input indicating a first movement of the second augmented reality item; determine whether the second augmented reality item is in proximity to the first augmented reality item; responsive to determining that the second augmented reality item is in proximity to the first augmented reality item, initiate a peer-to-peer transfer by: retrieving first user account information associated with the first user; receiving, from the second user device, second user account information; and transmitting, to an account processor indicated by the second user account information, the first user account information, the second user account information, and the transfer information.

Clause 10: The first augmented reality device of clause 9, wherein the memory stores further instructions that are configured to cause the device to: sending, to the second user device, a first request to authenticate the peer-to-peer transfer; receiving, from the second user device, authentication information; and determining that the second user is authenticated.

Clause 11: The first augmented reality device of clause 10, wherein the memory stores further instructions that are configured to cause the device to: receive, from the account processor, the request to authenticate the peer-to-peer transfer; and transmit, to the account processor, a message that the second user is authenticated.

Clause 12: The first augmented reality device of clause 10, wherein receiving, from the second user device, the authentication information further comprises an authentication gesture captured by the second user device.

Clause 13: The first augmented reality device of clause 10, wherein receiving, from the second user device, the authentication information further comprises an iris scan captured by the second user device.

Clause 14: The first augmented reality device of clause 10, wherein sending, to the second user device, the first request to authenticate the peer-to-peer transfer further comprises sending a message to a mobile device of the second user.

Clause 15: The first augmented reality device of clause 10, further comprising: sending, to the first user, a second request to authenticate the peer-to-peer transfer; receiving, from the first user, second authentication information; and determining that the first user is authenticated.

Clause 16: The first augmented reality device of clause 15, further comprising: determining that transfer is authenticated; and sending, to the account processor, that the transfer is authenticated.

Clause 17: An augmented reality system comprising: one or more processors; memory in communication with the one or more processors and storing instructions that are configured to cause the system to: receive, at a user device associated with a user, a first input indicating a first selection of a first augmented reality item; receive, at the user device, a second input indicating a first movement of the first augmented reality item; determine whether the first augmented reality item is in proximity to a purchasable item; responsive to determining that the first augmented reality item is in proximity to the purchasable item, initiate a transfer by: receiving image data, at the user device, containing a computer readable code associated with the purchasable item; processing the image data; retrieving, from the image data, store account information and transfer information regarding the purchasable item; retrieving user account information; and transmitting, to an account processor, the user account information, the store account information, and the transfer information.

Clause 18: The system of clause 17, wherein the memory stores further instructions that are configured to cause the system to: send, to the user, a request to authenticate the transfer; receive, from the user, authentication information; and determine that the transfer is authenticated.

Clause 19: The system of clause 18, wherein the user provides the authentication information using one of more of an application on a mobile device, an NFC reader, a gesture, or combinations thereof.

Clause 20: The system of clause 17, wherein the user device transmits a signal to vend the purchasable item.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A first augmented reality device comprising:
   one or more displays;
   one or more processors;
   memory in communication with the one or more processors and storing instructions that are configured to cause the device to:
   receive a first input indicating a first selection of a first augmented reality item associated with a first user;
   receive transfer information comprising an amount to transfer to a second user;
   receive, from a second user device, a second augmented reality item associated with the second user;
   display the first augmented reality item and the second augmented reality item via the one or more displays;
   receive a second input associated with a first movement of the first augmented reality item;
   determine whether the first augmented reality item is in proximity to the second augmented reality item;
   responsive to determining the first augmented reality item is in proximity to the second augmented reality item, initiate a peer-to-peer transfer by:
   retrieving first user account information associated with the first user;
   receiving, from the second user device, second user account information; and
   transmitting, to an account processor indicated by the first user account information, the first user account information, the second user account information, and the transfer information.

2. The first augmented reality device of claim 1, wherein the first augmented reality item is in proximity to the second augmented reality item when the first augmented reality item contacts the second augmented reality item in an augmented reality space.

3. The first augmented reality device of claim 1, wherein the first user account information further comprises a first identification and a first platform of the first user, and wherein the second user account information further comprises a second identification and a second platform of the second user.

4. The first augmented reality device of claim 1, wherein:
   the first augmented reality item is a payment instrument; and
   the second augmented reality item is a wallet.

5. The first augmented reality device of claim 1, wherein the memory storing further instructions that are configured to cause the device to:
   prior to initiating the peer-to-peer transfer, generate and display a confirmation request and receive a confirmation from the first user.

6. The first augmented reality device of claim 1, wherein determining whether the first augmented reality item is in proximity to the second augmented reality item further comprises:
   measuring a distance from the first augmented reality item to the second augmented reality item; and
   determining whether the distance is less than a predetermined threshold for a predetermined amount of time.

7. The first augmented reality device of claim 1, wherein receiving the second augmented reality item further comprises receiving, from a headset of the second user, a message indicating the second user selecting the second augmented reality item.

8. The first augmented reality device of claim 1, wherein the memory storing further instructions that are configured to cause the device to:
   generate and display a prompt to the first user on the one or more displays to confirm the second augmented reality item from an unknown contact may be displayed; and
   receive a third user input confirming that the second augmented reality item may be displayed on the one or more displays.

9. A first augmented reality device comprising:
   one or more displays;

one or more processors;

memory in communication with the one or more processors and storing instructions that are configured to cause the device to:

receive a first input indicating a first selection of a first augmented reality item of a first user;

receive transfer information comprising an amount to request from a second user;

receive, from a second user device, a second augmented reality item of the second user;

display the first augmented reality item and the second augmented reality item via the one or more displays;

receive, from the second user device, a second input indicating a first movement of the second augmented reality item;

determine whether the second augmented reality item is in proximity to the first augmented reality item;

responsive to determining that the second augmented reality item is in proximity to the first augmented reality item, initiate a peer-to-peer transfer by:

retrieving first user account information associated with the first user;

receiving, from the second user device, second user account information; and transmitting, to an account processor indicated by the second user account information, the first user account information, the second user account information, and the transfer information.

10. The first augmented reality device of claim 9, wherein the memory stores further instructions that are configured to cause the device to:

sending, to the second user device, a first request to authenticate the peer-to-peer transfer;

receiving, from the second user device, authentication information; and determining that the second user is authenticated.

11. The first augmented reality device of claim 10, wherein the memory stores further instructions that are configured to cause the device to:

receive, from the account processor, the request to authenticate the peer-to-peer transfer; and transmit, to the account processor, a message that the second user is authenticated.

12. The first augmented reality device of claim 10, wherein receiving, from the second user device, the authentication information further comprises an authentication gesture captured by the second user device.

13. The first augmented reality device of claim 10, wherein receiving, from the second user device, the authentication information further comprises an iris scan captured by the second user device.

14. The first augmented reality device of claim 10, wherein sending, to the second user device, the first request to authenticate the peer-to-peer transfer further comprises sending a message to a mobile device of the second user.

15. The first augmented reality device of claim 10, further comprising:

sending, to the first user, a second request to authenticate the peer-to-peer transfer;

receiving, from the first user, second authentication information; and determining that the first user is authenticated.

16. The first augmented reality device of claim 15, further comprising:

determining that transfer is authenticated; and sending, to the account processor, that the transfer is authenticated.

\* \* \* \* \*